United States Patent
Gomez et al.

(10) Patent No.: US 9,972,315 B2
(45) Date of Patent: May 15, 2018

(54) SPEECH PROCESSING DEVICE, SPEECH PROCESSING METHOD, AND SPEECH PROCESSING SYSTEM

(71) Applicant: HONDA MOTOR CO., LTD., Tokyo (JP)

(72) Inventors: Randy Gomez, Wako (JP); Kazuhiro Nakadai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 111 days.

(21) Appl. No.: 14/990,888

(22) Filed: Jan. 8, 2016

(65) Prior Publication Data
US 2016/0203828 A1   Jul. 14, 2016

(30) Foreign Application Priority Data

Jan. 14, 2015 (JP) .................................. 2015-005293
May 21, 2015 (JP) .................................. 2015-103670

(51) Int. Cl.
| | |
|---|---|
| *G10L 15/02* | (2006.01) |
| *G10L 15/20* | (2006.01) |
| G10L 21/0208 | (2013.01) |
| G10L 15/22 | (2006.01) |

(52) U.S. Cl.
CPC .............. *G10L 15/20* (2013.01); *G10L 15/02* (2013.01); *G10L 2015/227* (2013.01); *G10L 2021/02082* (2013.01)

(58) Field of Classification Search
CPC combination set(s) only.
See application file for complete search history.

(56) References Cited

U.S. PATENT DOCUMENTS

| | | | |
|---|---|---|---|
| 8,761,410 B1* | 6/2014 | Avendano ............. | H04M 9/085 381/17 |
| 2008/0232603 A1* | 9/2008 | Soulodre .................. | G01H 7/00 381/63 |
| 2009/0117948 A1* | 5/2009 | Buck ............................ | 455/570 |
| 2015/0012269 A1* | 1/2015 | Nakadai ............. | G10L 21/0208 704/233 |

(Continued)

FOREIGN PATENT DOCUMENTS

| | | |
|---|---|---|
| JP | 2008-228129 | 9/2008 |
| JP | 4532576 | 6/2010 |
| JP | 2010-283506 | 12/2010 |

OTHER PUBLICATIONS

Japanese Office Action dated Dec. 13, 2016, 3 pages.

*Primary Examiner* — Shreyans Patel
(74) *Attorney, Agent, or Firm* — Rankin, Hill & Clark LLP

(57) ABSTRACT

A speech processing device includes a sound source localization unit configured to determine a sound source position from acquired speech, a reverberation suppression unit configured to suppress a reverberation component of the speech to generate dereverberated speech, a feature quantity calculation unit configured to calculate a feature quantity of the dereverberated speech, a feature quantity adjustment unit configured to multiply the feature quantity by an adjustment factor corresponding to the sound source position to calculate an adjusted feature quantity, and a speech recognition unit configured to perform speech recognition using the adjusted feature quantity.

10 Claims, 17 Drawing Sheets

(56) References Cited

U.S. PATENT DOCUMENTS

2015/0066500 A1* 3/2015 Gomez ................... G10L 15/20
                                                                             704/233
2015/0088497 A1* 3/2015 Gomez ............... G10L 21/0208
                                                                             704/226

* cited by examiner

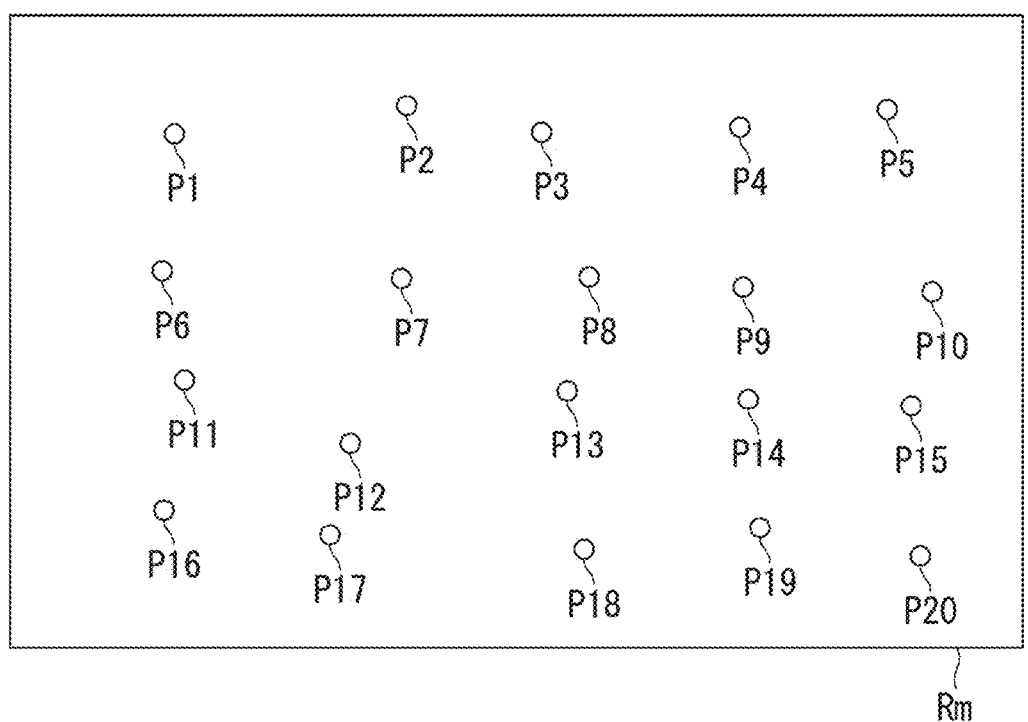

FIG. 9
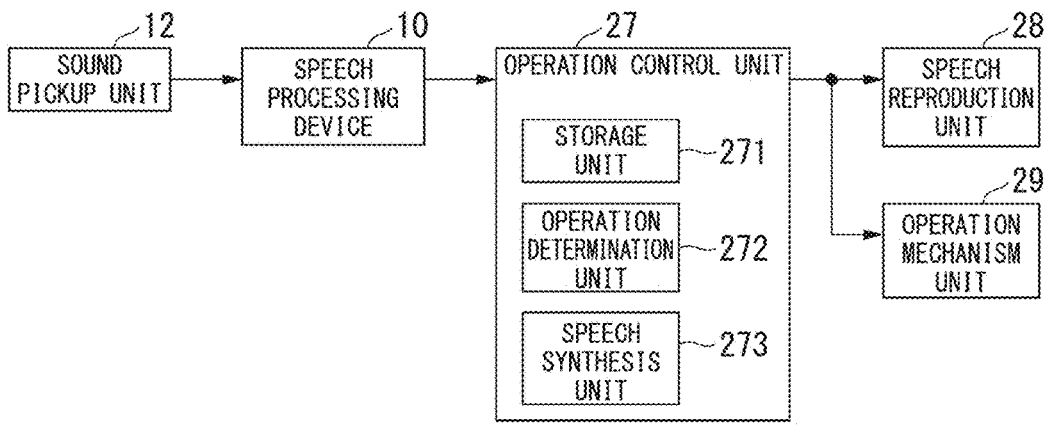
FIG. 10
Sp1: HI, I WENT TO A SUSHI RESTAURANT AND ATE AYU. HOW DO YOU SAY AYU IN ENGLISH?
Sp2: IT'S SWEETFISH.
FIG. 11
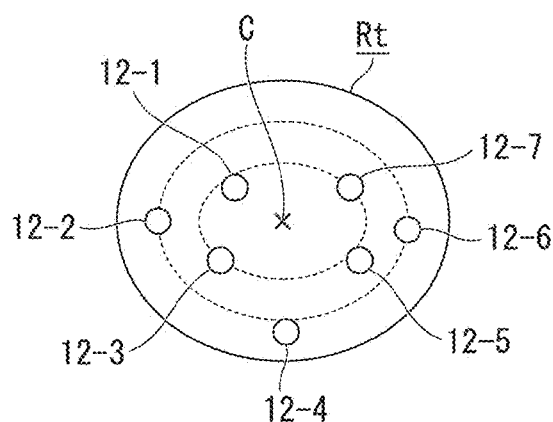

FIG. 14

| T1 | T2 | T3 | T4 | T5 | T6 | T7 |
|---|---|---|---|---|---|---|
| 100% | 100% | 100% | 100% | 99% | 97% | 97% |

FIG. 15

| METHOD | LABORATORY 1 | LABORATORY 2 | LABORATORY 3 |
|---|---|---|---|
| A | 82.7% | 79.5% | 75.9% |
| B | 81.8% | 76.1% | 71.9% |
| C | 94.3% | 90.9% | 86.3% |
| D | 84.2% | 80.1% | 75.6% |
| E | 87.2% | 84.7% | 83.5% |
| F | 81.3% | 78.0% | 72.5% |
| G | 83.8% | 75.0% | 65.6% |
| H | 83.8% | 75.9% | 67.7% |
| I | 90.3% | 86.3% | 83.7% |
| J | 94.3% | 91.1% | 90.2% |

FIG. 20

| METHOD | P1 | P2 | P3 | P4 | P5 | P6 |
|---|---|---|---|---|---|---|
| (a) | 90.0 % | 84.1 % | 74.2 % | 69.5 % | 43.9 % | 27.3 % |
| (b) | 90.2 % | 86.1 % | 77.0 % | 72.2 % | 58.3 % | 42.4 % |
| (c) | 90.4 % | 86.3 % | 78.1 % | 74.5 % | 60.6 % | 46.2 % |
| (d) | 90.7 % | 86.5 % | 79.3 % | 76.2 % | 63.4 % | 49.8 % |
| (e) | 90.8 % | 86.9 % | 79.6 % | 76.5 % | 68.3 % | 54.3 % |
| (f) | 91.2 % | 87.7 % | 82.8 % | 81.4 % | 74.7 % | 66.4 % |

| METHOD | P1 | P2 | P3 | P4 | P5 | P6 |
|---|---|---|---|---|---|---|
| (a) | 100.0 % | 94.0 % | 83.0 % | 78.0 % | 35.0 % | 10.0 % |
| (b) | 100.0 % | 94.0 % | 85.0 % | 80.0 % | 61.0 % | 30.0 % |
| (c) | 100.0 % | 94.0 % | 85.0 % | 81.0 % | 65.0 % | 35.0 % |
| (d) | 100.0 % | 94.0 % | 86.0 % | 83.2 % | 68.0 % | 38.0 % |
| (e) | 100.0 % | 94.0 % | 68.0 % | 84.0 % | 68.3 % | 43.0 % |
| (f) | 100.0 % | 96.0 % | 88.0 % | 86.0 % | 71.0 % | 59.0 % |

SPEECH PROCESSING DEVICE, SPEECH PROCESSING METHOD, AND SPEECH PROCESSING SYSTEM

CROSS-REFERENCE TO RELATED APPLICATIONS

This application claims priority to Japanese Patent Application No. 2015-5293, filed Jan. 14, 2015, and Japanese Patent Application No. 2015-103670, filed May 21, 2015, contents of which are incorporated herein by reference.

BACKGROUND OF THE INVENTION

Field of the Invention

The present invention relates to a speech processing device, a speech processing method, and a speech processing system.

Description of Related Art

Sound generated indoors is repeatedly reflected by a wall surface or an installation object and reverberation occurs.

In recorded sound, reverberation generated indoors is added to direct sound directly incoming from a sound source. If speech recognition processing is performed for recorded speech, a speech recognition rate becomes lower than original sound. Accordingly, a reverberation suppression technique for suppressing a reverberation component from recorded speech under a reverberant environment has hitherto been developed.

For example, Japanese Patent No. 4532576 describes a processing device which removes a diffuse reverberation component from a reverberation pattern of an impulse response generated in an environment, for example, a reverberation pattern with a diffuse reverberation component including an initial reflection component and a high-order reflection component of an impulse response to extract an initial reflection component, and reflects the initial reflection component in speech data for learning to learn an acoustic model for use in speech recognition.

SUMMARY OF THE INVENTION

The influence or degree of reverberation is different depending on the positional relationship between a sound source and a recording point of speech data.

There is a case where a speaker as a sound source or a mobile object, such as a robot, in which a sound pickup unit is installed, moves freely indoors. Since the position of a speaker who utters speech used for generating an acoustic model and the position of a speaker subjected to speech recognition at this time changes, there is a case where a speech recognition rate is lowered.

An aspect of the invention has been accomplished in consideration of the above-described point, and an object of the invention is to provide a speech processing device, a speech processing method, and a speech processing system capable of suppressing decrease of a speech recognition rate due to a change in sound source position under reverberation.

In order to attain the above-described object, the invention employs the following aspects.

[1] A speech processing device according to an aspect of the invention includes a sound source localization unit configured to determine a sound source position from acquired speech, a reverberation suppression unit configured to suppress a reverberation component of the speech to generate dereverberated speech, a feature quantity calculation unit configured to calculate a feature quantity of the dereverberated speech, a feature quantity adjustment unit configured to multiply the feature quantity by an adjustment factor corresponding to the sound source position to calculate an adjusted feature quantity, and a speech recognition unit configured to perform speech recognition using the adjusted feature quantity.

[2] In the aspect of [1] described above, the adjustment factor may be calculated in advance such that a likelihood for each phoneme which is calculated by using the adjusted feature quantity calculated by multiplying the feature quantity by the adjustment factor becomes higher than a likelihood for each phoneme calculated by using the feature quantity.

[3] In the aspect of [1] or [2] described above, the speech processing device may further include a model update unit configured to select a predetermined number of position-dependent acoustic models on the basis of the likelihood calculated by using the adjusted feature quantity and a position-dependent acoustic model of each sound source position and linearly combines model parameters of the selected position-dependent acoustic model to generate a position-dependent acoustic model corresponding to the sound source position, and the speech recognition unit may perform speech recognition using the acoustic model generated by the model update unit.

[4] In the aspect of [3] described above, the model update unit may further linearly combine model parameters of an acoustic model generated using clean speech to generate the position-dependent acoustic model corresponding to the sound source position determined by the sound source localization unit.

[5] In the aspect of [3] or [4] described above, the model update unit may eliminate a position-dependent acoustic model with the likelihood lower than a predetermined likelihood.

[6] A speech processing device according to another aspect of the invention includes a reverberation suppression unit configured to generate dereverberated speech for each acoustic environment from acquired speech on the basis of reverberation component data of each acoustic environment, a feature quantity calculation unit configured to calculate a feature quantity of the dereverberated speech, and a speech recognition unit configured to calculate a likelihood of an utterance state string from the feature quantity for each acoustic environment and selects an utterance state string on the basis of the likelihood. The reverberation component data is data indicating a contribution of a reverberation component given by correction reverberation characteristics obtained through predetermined filter processing for a predetermined reverberation characteristic, and a correction factor for use in the filter processing is set such that a likelihood which is calculated from a feature quantity of corrected speech obtained through the filter processing for the speech of each acoustic environment is higher than a likelihood calculated from a feature quantity of the speech of each acoustic environment.

[7] In the aspect of [6] described above, an acoustic model for use in calculating the likelihood may be a model representing an appearance probability of an utterance state by a linear combination of a normal distribution of a feature quantity, and for calculating the correction factor, the correction factor may be updated such that the likelihood is made higher using a gradient of the likelihood with respect to the correction factor.

[8] A speech processing system according to still another aspect of the invention includes a speech processing device and a sound pickup unit. The sound pickup unit picks up multi-channel speech, and the speech processing device includes a sound source localization unit configured to determine a sound source position from the multi-channel speech, a reverberation suppression unit configured to suppress a reverberation component of the speech to generate dereverberated speech, a feature quantity calculation unit configured to calculate a feature quantity of the dereverberated speech, a feature quantity adjustment unit configured to multiply the feature quantity by an adjustment factor corresponding to the sound source position to calculate an adjusted feature quantity, and a speech recognition unit configured to perform speech recognition using the adjusted feature quantity.

[9] In the aspect of [8] described above, the speech processing system may further include an operation control unit configured to execute an operation according to utterance recognized by the speech recognition unit.

[10] A speech processing method for a speech processing device according to still another aspect of the invention includes a sound source localization step of determining a sound source position from acquired speech, a reverberation suppression step of suppressing a reverberation component of the speech to generate dereverberated speech, a feature quantity calculation step of calculating a feature quantity of the dereverberated speech, a feature quantity adjustment step of multiplying the feature quantity by an adjustment factor corresponding to the sound source position to calculate an adjusted feature quantity, and a speech recognition step of performing speech recognition using the adjusted feature quantity.

According to the aspect of [1], [8] or [10] described above, speech recognition is performed using the adjusted feature quantity calculated by multiplying the feature quantity of dereverberated speech with the reverberation component suppressed by the adjustment factor according to the sound source position. Since the sound source position dependence of the influence of reverberation is relaxed, it is possible to suppress decrease of the speech recognition rate due to a change in sound source position under reverberation.

In the case of [2] described above, the adjusted feature quantity obtained by multiplying the feature quantity of dereverberated speech by the adjustment factor is used, whereby it is possible to make the likelihood for each phoneme higher than the feature quantity of dereverberated speech.

For this reason, it is possible to suppress decrease of a speech recognition rate due to a change in sound source position under reverberation.

In the case of [3] described above, the selection of a position-dependent acoustic model having a low likelihood significantly deteriorating speech recognition accuracy is avoided, and the model parameters of the selected position-dependent acoustic model are linearly combined, whereby a frequency component with no influence of reverberation which may vary between sound source positions in generating a position-dependent acoustic model is compensated for. For this reason, the generated position-dependent acoustic model is used in speech recognition, whereby it is possible to suppress decrease of a speech recognition rate due to a change in sound source position under reverberation.

In the case of [4] described above, the model parameters of the acoustic model generated using clean speech are further linearly combined, a frequency component with no influence of reverberation is compensated for. For this reason, the generated position-dependent acoustic model is used in speech recognition, whereby it is possible to suppress decrease of a speech recognition rate due to a change in sound source position under reverberation.

In the case of [5] described above, since the position-dependent acoustic model is updated such that a likelihood is not lowered according to a change in sound source position, it is possible to suppress decrease of a speech recognition rate due to a change in sound source position under reverberation.

According to the aspect of [6] described above, a reverberation component speech signal with a suppressed reverberation component is obtained using different pieces of reverberation component data according to the acoustic environment. Then, with respect to an utterance state string corresponding to an acoustic feature quantity string having the acoustic feature quantity calculated from the reverberation component speech signal obtained for each acoustic environment, phoneme strings corresponding to an utterance state string giving a higher likelihood are specified. For this reason, decrease of the speech recognition accuracy due to the influence of reverberation which may vary according to the acoustic environment is suppressed.

In the case of [7] described above, the gradient of the likelihood with respect to the correction factor is calculated by a product-sum operation between bases constituting the acoustic model. For this reason, it is possible to reduce the calculation amount or calculation time required for calculating the correction factor.

In the case of [9] described above, since the operation according to the utterance recognized by the speech recognition unit is executed, an operation desired by a user is more reliably instructed through utterance regardless of a change in sound source position under reverberation.

BRIEF DESCRIPTION OF THE DRAWINGS

FIG. 2 is a diagram showing an example of adjustment data.

FIG. 3 is a plan view showing a distribution example of sound source positions.

FIG. 9 is a block diagram showing the configuration of a speech processing system according to a second embodiment.

FIG. 10 is a diagram showing an example of interaction data.

FIG. 11 is a diagram showing an arrangement example of sound pickup elements.

FIG. 14 is a diagram showing an example of a speech detection rate.

FIG. 15 is a diagram showing an example of a word recognition rate according to each method.

FIG. 20 is a diagram showing an example of sound source position dependence of a word accuracy rate.

DETAILED DESCRIPTION OF THE INVENTION

First Embodiment

Figure 1:
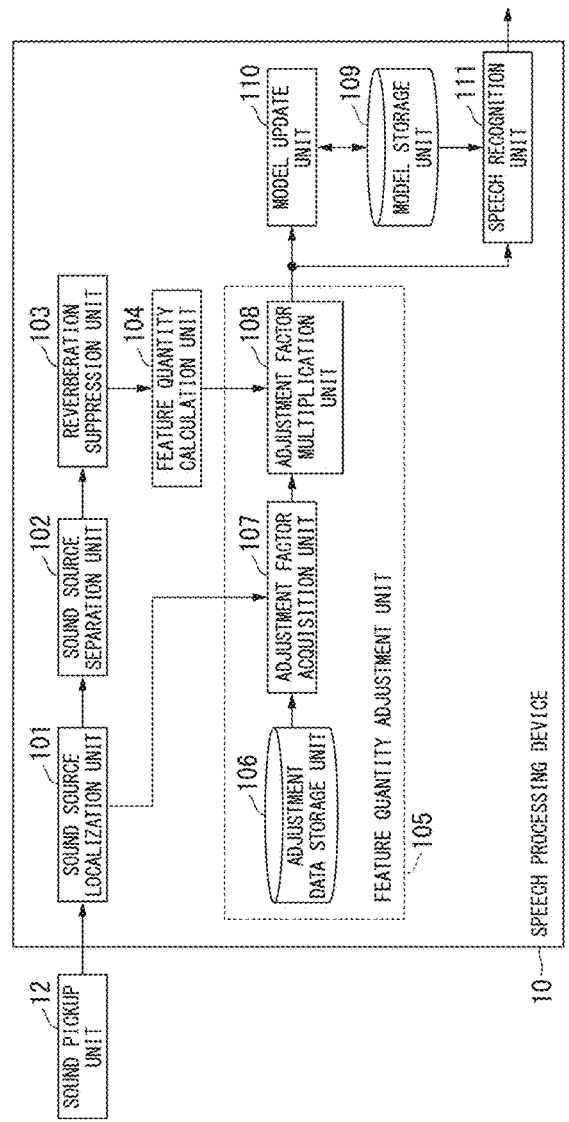
FIG. 1 is a block diagram showing the configuration of a speech processing system according to a first embodiment.

Hereinafter, a first embodiment of the invention will be described referring to the drawings.

FIG. 1 is a block diagram showing the configuration of a speech processing system 1 according to this embodiment.

The speech processing system 1 includes a speech processing device 10 and a sound pickup unit 12.

The speech processing device 10 determines a sound source position from a speech signal of P (where P is an integer equal to or greater than 3) channels input from the sound pickup unit 12 and suppresses a reverberation component of the speech signal. The speech processing device 10 calculates a feature quantity of speech with the reverberation component suppressed and multiplies the calculated feature quantity by an adjustment factor corresponding to the determined sound source position to calculate an adjusted feature quantity. The speech processing device 10 performs speech recognition using the calculated adjusted feature quantity.

The sound pickup unit 12 records the speech signal of the P channels and outputs the recorded speech signal to the speech processing device 10. The sound pickup unit 12 is a microphone array in which P sound pickup elements (microphones) are arranged at different positions. The sound pickup unit 12 may transmit the recorded speech signal to the speech processing device 10 in a wireless manner or in a wired manner. The position of the sound pickup unit 12 may be fixed or may be movably provided in a mobile object, such as a robot or a vehicle.

The sound pickup unit 12 may be provided integrally with or separately from the speech processing device 10.

Reverberation is a phenomenon in which emitted sound is incoming even after a sound source stops emission of sound. Reverberation occurs when a sound wave is repeatedly reflected by a wall surface dividing indoors and outdoors or an object surface, such as an installation object. In general, in the sound pickup unit 12, direct sound incoming directly from a sound source and reflected sound (reflection) reflected from an object are recorded. In reflected sound, a portion where the number of reflections is comparatively small and each reflection pattern is distinguished since an elapsed time after direct sound is generated is comparatively shorter (for example, about 30 ms or less) than a predetermined time is called early reflection. In reflected sound, a portion where the number of reflections is comparatively large and each reflection pattern cannot be distinguished since the elapsed time is longer than the predetermined time is called late reflection. Late reflection is called late reverberation or simply reverberation.

If reverberation occurs, reverberation due to speech uttered previously is superimposed on speech uttered currently. For this reason, speech with reverberation has a speech recognition rate lower than speech with no reverberation. One of the factors is that, in an acoustic model for use in speech recognition, an acoustic feature quantity corresponding to an utterance state forming a phoneme does not necessarily match an acoustic feature quantity calculated on the basis of speech with reverberation (mismatch). Furthermore, reverberation lowers articulation (intelligibility) of the content of utterance in a human hearing sense. In the following description, a bad influence due to such reverberation is called the influence (smearing) of reverberation. The influence of reverberation is also called contamination. Furthermore, speech with reverberation, speech with suppressed reverberation, and speech with a negligibly small reverberation component are respectively called reverberant speech, dereverberated speech, and clean speech.

Next, the configuration of the speech processing device 10 will be described.

The speech processing device 10 includes a sound source localization unit 101, a sound source separation unit 102, a reverberation suppression unit 103, a feature quantity calculation unit 104, a feature quantity adjustment unit 105, a model storage unit 109, a model update unit 110, and a speech recognition unit 111.

The sound source localization unit 101 determines the sound source position from the speech signal of the P channels input from the sound pickup unit 12. For example, the sound source localization unit 101 executes a multiple signal classification (MUSIC) method for the speech signal of the P channels in each period (for example, 50 ms) determined in advance. The MUSIC method will be described below. The sound source localization unit 101 outputs sound source position information indicating the determined sound source position of each sound source and the speech signal of the P channels to the sound source separation unit 102, and outputs the sound source position information to the feature quantity adjustment unit 105.

The sound source separation unit 102 separates the speech signal of the P channels input from the sound source localization unit 101 into sound source-specific speech signals as the speech signals of the sound sources on the basis of the sound source positions indicated by the sound source position information.

For example, a speech signal $[x(\omega)]$ of P channels and L (where L is an integer equal to or greater than 1 and equal to or less than P) sound source-specific speech signals $[s(\omega)]$ in a frequency domain have the relationship indicated by Expression (1).

$$[x(\omega)] = [A(\omega)][s(\omega)] + [\eta(\omega)] \quad (1)$$

In Expression (1), [ . . . ] indicates a vector or a matrix. $[x(\omega)]$ is a P-dimensional vector $[x_1(\omega), x_2(\omega), \ldots, x_P(\omega)]^T$. $\omega$ indicates a frequency. T indicates a transpose of a vector or a matrix. $[A(\omega)]$ is a matrix and P rows and L columns with a transfer function from each sound source to the sound pickup element of each channel as a component. $[\eta(\omega)]$ indicates an additive noise signal of P channels. It can be assumed that the additive noise signal [η(ω)] has no correlation with the sound source-specific speech signals [s(ω)] statistically.

The sound source separation unit 102 uses, for example, a geometric-constrained high-order decorrelation-based source separation (GHDSS) method as a sound source separation method. The GHDSS method will be described below. The sound source separation unit 102 outputs the separated sound source-specific speech signal of each sound source to the reverberation suppression unit 103.

The reverberation suppression unit 103 suppresses a reverberation component for the sound source-specific speech signal of each sound source input from the sound source separation unit 102 and generates a dereverberated speech signal of each sound source. For example, as shown in Expression (2), the reverberation suppression unit 103 subtracts a reverberation component [r'(ω)] from a reverberant sound source-specific speech signal [u'(ω)] before reverberation suppression to generate a dereverberated speech signal [s'$^{(x,y)}$(ω)].

$$[s'^{(x,y)}(\omega)] \approx [u'(\omega)] - [r'(\omega)] \qquad (2)$$

A subscript (x,y) on the left side in Expression (2) indicates a sound source position. x and y are coordinate values in a direction orthogonal to each other on a horizontal plane. A reverberation suppression method will be described below. The reverberation suppression unit 103 outputs the dereverberated speech signal of each sound source to the feature quantity calculation unit 104.

The feature quantity calculation unit 104 calculates an acoustic feature quantity for the dereverberated speech signal of each sound source input from the reverberation suppression unit 103 in each predetermined period (for example, 10 ms). The feature quantity calculation unit 104 calculates, as the acoustic feature quantity, for example, a 26-dimensional vector [f$^{(x,y)}$] having 12th order m-frequency cepstrum coefficients (MFCC), 12th order delta MFCC (Δ-MFCC), energy, and delta energy (Δ-energy) for each sound source. The feature quantity calculation unit 104 outputs the calculated acoustic feature quantity [f$^{(x,y)}$] to the feature quantity adjustment unit 105. The relationship between the dereverberated speech signal [s'$^{(x,y)}$(ω)] and the acoustic feature quantity [f$^{(x,y)}$] is shown in Expression (3). In Expression (3), F( . . . ) indicates an arithmetic operation for calculating the acoustic feature quantity of . . . .

$$f^{(x,y)} = F([s'^{(x,y)}(\omega)]) \qquad (3)$$

The feature quantity adjustment unit 105 determines an adjustment factor [c'$^{(x,y)}$] corresponding to the sound source position (x,y) indicated by the sound source position information input from the sound source localization unit 101. The feature quantity adjustment unit 105 multiplies the acoustic feature quantity [f$^{(x,y)}$] of each sound source input from the feature quantity calculation unit 104 by the determined adjustment factor [c'$^{(x,y)}$] to calculate an adjusted feature quantity [f'].

The feature quantity adjustment unit 105 includes an adjustment data storage unit 106, an adjustment factor acquisition unit 107, and an adjustment factor multiplication unit 108.

The adjustment data storage unit 106 stores adjustment data indicating the adjustment factor [c'$^{(x,y)}$] of M (where M is an integer equal to or greater than 2, for example, 100) sound source positions in advance. The adjustment factor [c'$^{(x,y)}$] is determined such that a likelihood P(f(x,y)([c'(x,y)])|w) becomes higher when the adjusted feature quantity [f'] is used than when the acoustic feature quantity [f$^{(x,y)}$] is calculated by using a predetermined acoustic model for at least a set w of known phoneme strings is used. Preferably, the adjustment factor [c'$^{(x,y)}$] is an adjustment factor [c'$^{(x,y)}$] which maximizes a likelihood P(f(x,y)([c(x,y)])|w) as shown in Expression (4). Adjustment data will be described below.

$$[q''^{(s)}] = \underset{[q^{(s)}] \in Q^{(s)}}{\operatorname{argmax}} \log P([q_j^{(s)}] \mid [q_{j-1}^{(s)}, w, [f^{(x,y)}]) \qquad (4)$$

The adjustment factor acquisition unit 107 acquires the adjustment factor [c'$^{(x,y)}$] corresponding to the sound source position (x,y) indicated by the sound source position information input from the sound source localization unit 101 with reference to adjustment data stored in the adjustment data storage unit 106. When the sound source position (x,y) which matches the sound source position (x,y) indicated by the sound source position information is present in adjustment data, the adjustment factor acquisition unit 107 reads the adjustment factor [c'$^{(x,y)}$] corresponding to the sound source position (x,y) from the adjustment data storage unit 106. When the sound source position (x,y) which matches the sound source position (x,y) indicated by the sound source position information is absent in adjustment data, the adjustment factor acquisition unit 107 reads an adjustment factor [c''$^{(x,y)}$] corresponding to each of sound source positions (x",y") with a range determined in advance from the sound source position (x,y) from the adjustment data storage unit 106. Then, the adjustment factor acquisition unit 107 linearly interpolates or extrapolates the read adjustment factor [c''$^{(x,y)}$] to calculate the adjustment factor [c'$^{(x,y)}$] corresponding to the sound source position (x,y). The adjustment factor acquisition unit 107 outputs the acquired adjustment factor [c'$^{(x,y)}$] to the adjustment factor multiplication unit 108.

As shown in Expression (5), the adjustment factor multiplication unit 108 multiplies the acoustic feature quantity [f$^{(x,y)}$] of each sound source input from the feature quantity calculation unit 104 by the adjustment factor [c'$^{(x,y)}$] of each sound source input from the adjustment factor acquisition unit 107 to calculate the adjusted feature quantity [f'] of each sound source. The adjustment factor multiplication unit 108 outputs the adjusted feature quantity [f'] calculated for each sound source to the model update unit 110 and the speech recognition unit 111.

$$[f'] = [c'^{(x,y)}][f^{(x,y)}] \qquad (5)$$

The model storage unit 109 stores M+1 acoustic models and at least one language model for use in speech recognition. Of the M+1 acoustic models, the M acoustic models $\Psi^{(n)}$ are acoustic models $\Psi^{(n)}$ which are generated using speech generated at each of M sound source positions under reverberation. In the following description, the M acoustic models $\Psi^{(n)}$ are called position-dependent acoustic models (position-sensitive acoustic models) $\Psi^{(n)}$. Another acoustic model is a clean speech acoustic model $\lambda^{(s)}$ which is generated using clean speech. The position-dependent acoustic models $\Psi^{(n)}$ and the clean speech acoustic model $\lambda^{(s)}$ are respectively hidden Markov models (HMM) based on a Gaussian mixture model (GMM).

The GMM is a kind of a statistical model represented by weighting and adding an output probability in a certain utterance state with respect to the input acoustic feature quantity or the adjusted feature quantity with a plurality of (for example, 256) normal distributions as a base. The HMM has a characteristic which is defined with a mixture weight $C_{im}$, a mean [$\mu_{im}$], and a covariance matrix [$\Sigma_{im}$] which are the model parameters of the GMM, and statistics, such as a transition probability $a_{ij}$ between utterance states, as model parameters. Here, m indicates an individual base, i indicates a state at this time, and j indicates the next state. The language model is a statistical model representing a constraint of a phoneme string and a probability of each phoneme string, and for example, is an N-gram.

The model update unit 110 calculates a likelihood for each of the M position-dependent acoustic models $\Psi^{(n)}$ and the clean speech acoustic model $\lambda^{(s)}$ stored in the model storage unit 109 with respect to the adjusted feature quantity [f'] of each sound source input from the adjustment factor multiplication unit 108. The model update unit 110 selects the N position-dependent acoustic models $\Psi^{(n)}$ and the clean speech acoustic model $\lambda^{(s)}$ in order from the position-dependent acoustic model $\Psi^{(n)}$ with the highest calculated likelihood.

The model update unit 110 linearly combines the model parameters of the selected N position-dependent acoustic models $\Psi^{(n)}$ and the clean speech acoustic model $\lambda^{(s)}$ to calculate model parameters of a new position-dependent acoustic model $\lambda^{(upd)}$. The model update unit 110 stores the position-dependent acoustic model $\lambda^{(upd)}$ defined by the calculated model parameters in the model storage unit 109 corresponding to the sound source position of the sound source. Processing relating to the update of an acoustic model will be described below.

The speech recognition unit 111 reads a position-dependent acoustic model $\lambda^{(upd)}$ newly generated for each sound source from the model storage unit 109 with respect to the adjusted feature quantity [f'] of each sound source input from the adjustment factor multiplication unit 108, and performs processing relating to speech recognition. Here, the speech recognition unit 111 calculates a likelihood for each phoneme string using the position-dependent acoustic model $\lambda^{(upd)}$ read for the adjusted feature quantity [f'] of the sound source. The speech recognition unit 111 calculates a likelihood of each candidate of a sentence represented by phoneme strings on the basis of a language model stored in the model storage unit 109 among possible phoneme strings, and outputs recognition data representing a sentence with the highest likelihood to the outside of the speech processing device 10.

In this way, since the processing relating to speech recognition is performed using the position-dependent acoustic model $\lambda^{(upd)}$ with decrease of the likelihood suppressed according to the sound source position, decrease of the speech recognition accuracy due to the difference in the influence of reverberation according to the sound source position is suppressed.

(Sound Source Localization)

Next, the MUSIC method which is one method of sound source localization will be described.

The sound source localization unit 101 includes a storage unit which stores a transfer function of each of sound source positions distributed at a predetermined interval (for example, 0.5 m) in advance. The sound source localization unit 101 generates a transfer function vector D(n) having transfer functions $A_{[1][m]}(\omega)$ to each channel p (where p is an integer equal to or greater than 1 and equal to or less than P) as elements for each sound source position n.

The sound source localization unit 101 converts an acoustic signal $x_p(t)$ (where t is a time) of each channel p to a frequency domain for each frame having a predetermined number of samples to calculate a conversion factor $x_p(\omega)$ and calculates an input correlation matrix [$R_{xx}$] shown in Expression (6) from the calculated conversion factor.

$$[R_{xx}]=E[[x(\omega)][x(\omega)]^*] \quad (6)$$

In Expression (6), E[ ... ] indicates an expected value of ... [ ... ]* indicates a conjugate of a matrix or a vector.

Next, the sound source localization unit 101 calculates an eigenvalue $\delta_i$ and an eigenvector [$e_i$] of the input correlation matrix [$R_{xx}$]. The input correlation matrix [$R_{xx}$], the eigenvalue $\delta_i$, and the eigenvector [$e_i$] have a relationship shown in Expression (7).

$$[R_{xx}][e_i]=\delta_i[e_i] \quad (7)$$

In Expression (7), i is an integer equal to or greater than 1 and equal to or less than P. The order of the index i is a descending order of the eigenvalue $\delta_1$.

The sound source localization unit 101 calculates a spatial spectrum $P_{sp}(n)$ shown in Expression (8) on the basis of the transfer function vector D(n) and the calculated eigenvector [$e_i$].

$$P_{sp}(n) = \frac{|D^*(n)D(n)|}{\sum_{i=K+1}^{P} |D^*(n)[e_i]|} \quad (8)$$

In Expression (8), K is the number of detectable sound sources (for example, 1), and is a natural number determined in advance to be less than P.

The sound source localization unit 101 calculates the total sum of the spatial spectrum $P_{sp}(n)$ in a frequency band with an S/N ratio greater than a threshold (for example, 20 dB) determined in advance as an extended spatial spectrum $P_{ext}(n)$. The sound source localization unit 101 determines the sound source position n taking the maximum value of the calculated extended spatial spectrum $P_{ext}(n)$.

The sound source localization unit 101 may calculate the sound source position using other methods instead of the MUSIC method. The sound source localization unit 101 may use, for example, a generalized eigenvalue decomposition (GEVD)-MUSIC method, a generalized singular value decomposition (GSVD)-MUSIC method, a weighted delay and sum beam forming (WDS-BF) method, or the like.

(Sound Source Separation)

Next, the GHDSS method which is one method of sound source separation will be described.

The GHDSS method is a method which adaptively calculates a separation matrix [V($\omega$)] such that separation sharpness $J_{SS}([V(\omega)])$ and geometric constraint $J_{GC}([V(\omega)])$ as two cost functions are reduced. The separation matrix [($\omega$)] is a matrix which is used in order to calculate a speech signal (estimated value vector) [u'($\omega$)] of each sound source of L channels by multiplying the speech signal [x($\omega$)] of the P channels input from the sound source localization unit 101.

The separation sharpness $J_{SS}([V(\omega)])$ and the geometric constraint $J_{GC}([V(\omega)])$ are respectively represented by Expressions (9) and (10).

$$J_{SS}([V(\omega)])=\|\phi([u'(\omega)])[u'(\omega)]^H-\text{diag}[\phi([u'(\omega(\omega)])^H]\|^2 \quad (9)$$

$$J_{GC}([V(\omega)])=\|\text{diag}[[V(\omega)]-[I]]\|^2 \quad (10)$$

In Expressions (9) and (10), $\| \ldots \|^2$ is a Frobenius norm of a matrix . . . . The Frobenius norm is a square sum (scalar value) of element values constituting a matrix. $\phi([u'(\omega)])$ is a nonlinear function of the speech signal [u'($\omega$)], for example, a hyperbolic tangent function. $[ \ldots ]^H$ indicates a conjugate transpose of a matrix or a vector. diag[ . . . ] indicates the total sum of diagonal components of a matrix . . . . Accordingly, the separation sharpness $J_{SS}([V(\omega)])$ is an index value representing the magnitude of a non-diagonal component between channels of the spectrum of the speech signal (estimated value), that is, the degree of erroneous separation of a certain sound source as a different sound source.

In Expression (10), [I] indicates a unit matrix. Accordingly, the geometric constraint $J_{GC}([V(\omega)])$ is an index value which represents the degree of error between the spectrum of the speech signal (estimated value) and the spectrum of the speech signal (sound source).

Then, as shown in Expression (11), the sound source separation unit 102 calculates the sound source-specific speech signal $[u'(\omega)]$ relating to each of L sound sources by multiplying the speech signal $[x(\omega)]$ of the P channel input from the sound source localization unit 101 by the separation matrix $[V(\omega)]$.

$$[u'(\omega)]=[V(\omega)][x(\omega)] \quad (11)$$

(Reverberation Suppression)

Next, reverberation suppression according to this embodiment will be described. The reverberation suppression unit 103 separates the reverberant sound source-specific speech signal $u'(\omega)$ of each sound source input from the sound source separation unit 102 into band components $u'(\omega)$ of each frequency band b. The reverberation suppression unit 103 multiplies the separated band component $u_b'(\omega)$ by a reverberation component factor $\delta_b$ of the frequency band b to calculate a reverberation component $r_b'(\omega)$. The reverberation suppression unit 103 combines the calculated reverberation components $r_b'(\omega)$ between the frequency bands b to calculate a reverberation component $e(\omega)$ of all frequency bands. The reverberation suppression unit 103 subtracts the calculated reverberation component $e(\omega)$ from the reverberant sound source-specific speech signal $u'(\omega)$ for each sound source to calculate a dereverberated speech signal $s'^{(x,y)}(\omega)$ of each sound source.

The reverberation suppression unit 103 executes the following processing (a) to (e) in advance to calculate the reverberation component factor $\delta_b$ in advance and sets the reverberation component factor $\delta_b$ therein. According to the processing (a) to (e), the reverberation component factor $\delta_b$ is calculated such that decrease of the speech recognition accuracy is suppressed as much as possible.

(a) As an initial value of the reverberation component factor $\delta_b$ of each frequency band b, a reverberation component factor $\delta_{b,MMSE}$ which minimizes a mean square error (MSE) $E_m$ of a known reverberation component $X_L$ and an input signal component x is determined (MMSE: Minimum MSE).

That is, the MMSE is a method which calculates the reverberation component factor $\delta_{b,MMSE}$ such that the MSE which is a square value of a residual error of the reverberation component XL, the reverberation component factor $\delta_b$ for each frequency band b, and the total sum of the value obtained by multiplying the input signal component x is minimized.

(b) With respect to a set w of known phoneme strings, an acoustic model $\lambda_{MMSE}$ which maximizes a likelihood for a dereverberated speech signals $\delta^{b,MMSE}(\omega)$ calculated by using the reverberation component factor $\delta_{b,MMSE}$ is determined as an initial value of an acoustic model $\lambda$.

(c) With respect to the dereverberated speech signal s' calculated by using the reverberation component factor $\delta_b$, a reverberation component factor $\delta_{b,opt}$ of each frequency band b which maximizes the likelihood calculated by using the set w of phoneme strings and the acoustic model $\lambda$ is calculated.

(d) With respect to the reverberation component factor $\delta_{b,opt}$ and the set w of phoneme strings, model parameters which give an acoustic model $\lambda_{opt}$ maximizing a likelihood are determined.

(e) The acoustic model $\lambda^{(s)}$ at this time is updated to the calculated acoustic model $\lambda_{opt}$, and the processing (c) and (d) is repeated. The processing is repeated until an absolute value relating to a variation of the maximum value of the likelihood converges to be less than a predetermined variation threshold. Thereafter, the calculated reverberation component factor $\delta_{b,opt}$ is determined as the reverberation component factor $\delta_b$.

The processing (a) to (e) described above is described in detail in the following document.

Gomez, R. and Kawahara, T. "Robust speech recognition based on dereverberation parameter optimization using acoustic model likelihood" Proceedings IEEE Transactions Speech and Acoustics Processing, Vol. 19, No. 7, 2010

The acoustic model $\lambda$ may be set in advance in the reverberation suppression unit 103, and the processing (c) and (d) may be performed in parallel with suppression of the reverberation component (online processing). Accordingly, it is possible to suppress a reverberation component according to a change in a reverberant environment. Furthermore, the speech recognition unit 111 may use the acoustic model $\lambda$ obtained through the processing (a) to (e) for speech recognition processing. For this reason, it is possible to suppress decrease of a speech recognition rate due to the influence of reverberation.

(Adjustment Data)

Next, adjustment data will be described. FIG. 2 is a diagram showing an example of adjustment data. Adjustment data is data indicating the adjustment factor [c(x,y)] of each of the M sound source positions (x,y). In an example shown in the second row of FIG. 2, a sound source position $(x_1,y_1)$ corresponds to an adjustment factor $[c(x_1,y_1)]$. In the example shown in FIG. 2, the notation of symbol [ . . . ] indicating a vector is omitted.

(Sound Source Position)

Next, an example of sound source positions corresponding to adjustment factors or position-dependent acoustic models will be described. FIG. 3 is a plan view showing a distribution example of sound source positions. As shown in FIG. 3, M (in an example shown in FIG. 3, M=20) sound source positions are distributed over the entire flat surface of a room. The M sound source positions may be arranged at regular intervals or may be arranged randomly.

(Processing Data Generation Unit)

Next, the configuration of the processing data generation unit 14 according to this embodiment will be described. The processing data generation unit 14 calculates the adjustment factor [c(x,y)] for each sound source position in advance using clean speech and generates the position-dependent acoustic model $\Psi^{(n)}$ (offline learning).

Figure 4:
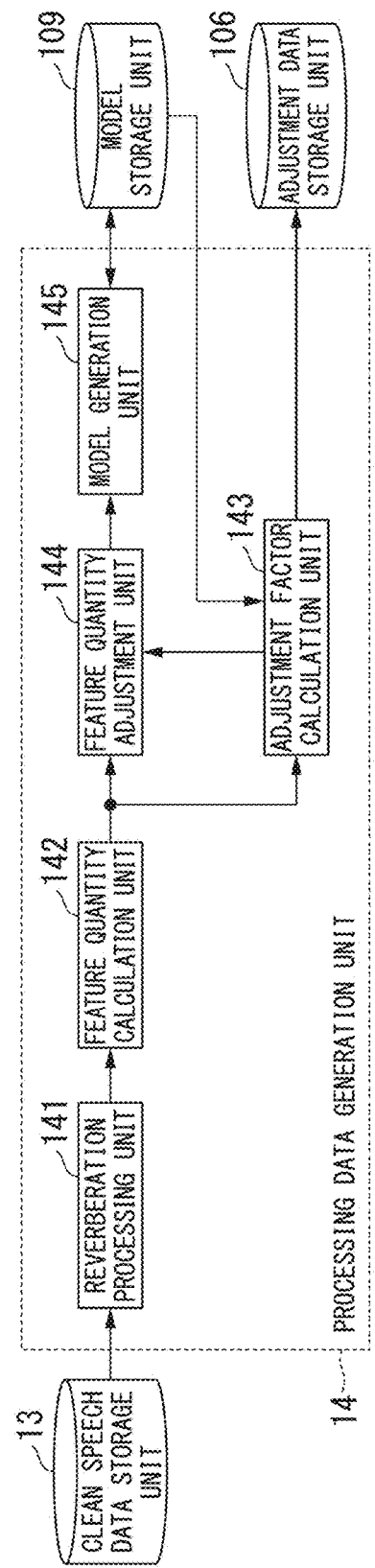
FIG. 4 is a block diagram showing a processing data generation unit according to the first embodiment.

FIG. 4 is a block diagram showing the processing data generation unit 14 according to this embodiment. The processing data generation unit 14 includes a reverberation processing unit 141, a feature quantity calculation unit 142, an adjustment factor calculation unit 143, a feature quantity adjustment unit 144, and a model generation unit 145. A clean speech database which is formed from speech signals of clean speech indicating various contents of utterance as learning speech signals is stored in a clean speech data storage unit 13 in advance. The clean speech acoustic model $\lambda^{(s)}$ is stored in the model storage unit 109 in advance.

The reverberation processing unit 141 is provided with a storage unit which stores an impulse response from each sound source position to the sound pickup unit 12 installed at a predetermined position in advance. The reverberation processing unit 141 performs a convolution operation of the speech signal of clean speech read from the clean speech data storage unit 13 and the impulse response of each sound source position and generates a reverberant speech signal indicating reverberant speech relating to the sound source position (x,y). Similarly to the reverberation suppression unit 103, the reverberation processing unit 141 suppresses a reverberation component for the generated reverberant speech signal to generate a dereverberated speech signal. The reverberation processing unit 141 outputs the generated dereverberated speech signal to the feature quantity calculation unit 142.

Similarly to the feature quantity calculation unit 104 (FIG. 1), the feature quantity calculation unit 142 calculates an acoustic feature quantity [f(x,y)] for the dereverberated speech signal relating to the sound source position (x,y) input from the reverberation processing unit 141. The feature quantity calculation unit 142 outputs the calculated acoustic feature quantity [f(x,y)] to the adjustment factor calculation unit 143 and the feature quantity adjustment unit 144.

The adjustment factor calculation unit 143 calculates an adjustment factor $[c'^{(x,y)}]$ relating to the sound source position (x,y) based on the acoustic feature quantity [f(x,y)] relating to the sound source position (x,y) input from the feature quantity calculation unit 142 and the clean speech acoustic model $\lambda^{(s)}$ read from the model storage unit 109. Here, as shown in Expression (12), the adjustment factor calculation unit 143 calculates a likelihood for each of possible utterance state strings $q^{(s)}$ in the clean speech acoustic model $\lambda^{(s)}$ for a set w of known phoneme strings indicating utterance of clean speech used for calculating the acoustic feature quantity [f(x,y)] and the input acoustic feature quantity [f(x,y)] and selects an utterance state string $q'^{(s)}$ having the maximum calculated likelihood.

$$[q'^{(s)}] = \underset{q^{(s)} \in Q^{(s)}}{\operatorname{argmax}} \sum_j \log P(q_j^{(s)} | q_{j-1}^{(s)}, w, [f^{(x,y)}]) \quad (12)$$

In Expression (12), $Q^{(s)}$ indicates a set of all possible utterance state strings $q^{(s)}$ in the clean speech acoustic model $\lambda^{(s)}$. $q_j^{(s)}$ and $q_{j-1}^{(s)}$ respectively indicate j-th and (j−1)th utterance states among the utterance states forming the utterance state string $q^{(s)}$. Then, the adjustment factor calculation unit 143 determines the adjustment factor $[c^{(x,y)}]$ maximizing the likelihood $P(f(x,y)([c(x,y)])|w)$ shown in Expression (4) as the adjustment factor $[c'^{(x,y)}]$ on the basis of the selected utterance state string $q'^{(s)}$ for the adjusted feature quantity [f(x,y)] obtained by multiplying the acoustic feature quantity [f(x,y)] by the adjustment factor $[c'^{(x,y)}]$. A method which calculates the adjustment factor $[c^{(x,y)}]$ maximizing the likelihood $P([f(x,y)]([c(x,y)])|w)$ is described in detail in the following document.

Seltzer, M. and Stern, R. "Subband likelihood-maximizing beamforming for speech recognition in reverberant environments", In IEEE Transaction on Audio, Speech, and Language Processing, Vol. 14, No. 6, 2006

The adjustment factor calculation unit 143 corresponds each sound source position (x,y) to the adjustment factor $[c'^{(x,y)}]$ calculated for the sound source position to generate adjustment data, and stores the generated adjustment data in the adjustment data storage unit 106. The adjustment factor calculation unit 143 outputs the adjustment factor $[c'^{(x,y)}]$ calculated for each sound source position to the feature quantity adjustment unit 144.

As shown in Expression (5), the feature quantity adjustment unit 144 multiplies the acoustic feature quantity $[f^{(x,y)}]$ of the sound source position(x,y) relating to the sound source position(x,y) by the adjustment factor $[c'^{(x,y)}]$ of each sound source position (x,y) input from the adjustment factor calculation unit 143, and calculates an adjusted feature quantity [f'] relating to the sound source position (x,y). The feature quantity adjustment unit 144 outputs the calculated adjusted feature quantity [f'] to the model generation unit 145.

The model generation unit 145 generates a position-dependent acoustic model $\Psi^{(n)}$ relating to the sound source position (x,y) using the clean speech acoustic model $\lambda^{(s)}$ read from the model storage unit 109 and the adjusted feature quantity [f'] of each sound source position (x,y) input from the feature quantity adjustment unit 144. n is an index indicating the sound source position (x,y). In generating the position-dependent acoustic model $\Psi^{(n)}$, the model generation unit 145 calculates a likelihood for each given adjusted feature quantity [f'] and updates the model parameters of the position-dependent acoustic model $\Psi^{(n)}$ such that the likelihood increases (is maximized). The model generation unit 145 repeatedly updates the model parameters until the absolute value of the variation of the likelihood accompanied by the model parameters becomes smaller than (converges on) a predetermined variation threshold. Thereafter, the model generation unit 145 stores the sound source position (x,y) in the model storage unit 109 corresponding to the position-dependent acoustic model $\Psi^{(n)}$ relating to the sound source position (x,y).

Here, the model generation unit 145 calculates, as the model parameters of each position-dependent acoustic model $\Psi^{(n)}$, a mixture weight $C_{im}^{(n)}$, a mean $[\mu_{im}^{(n)}]$, a covariance matrix $[\Sigma_{im}^{(n)}]$, and a transition probability $a_{ij}^{(n)}$ as shown in Expressions (13) to (16).

$$C_{im}^{(n)} = \frac{L_{im}^{(n)}}{\sum_{m=1}^{M} L_{im}^{(n)}} \quad (13)$$

$$[\mu_{im}^{(n)}] = \frac{[m_{im}^{(n)}]}{L_{im}^{(n)}} \quad (14)$$

$$[\Sigma_{im}^{(n)}] = \frac{[v_{im}^{(n)}]}{L_{im}^{(n)}} - [\mu_{im}^{(n)}][\mu_{im}^{(n)}]^T \quad (15)$$

$$a_{ij}^{(n)} = \frac{L_{ij}^{(n)}}{\sum_{j=1}^{J} L_{ij}^{(n)}} \quad (16)$$

In Expressions (13) to (16), $L_{im}^{(n)}$, $[m_{im}^{(n)}]$, and $[v_{im}^{(n)}]$ respectively indicate an accumulated mixture occupancy relating to a base m in a state i of each sound source position n, a mean, and a variance. Furthermore, $L_{ij}^{(n)}$ indicates a state transition occupancy from the state i to j of each sound source position n, and J indicates the number of states of a transition destination.

(Update of Acoustic Model)

Next, processing relating to the update of an acoustic model in the model update unit 110 will be described.

Figure 5:
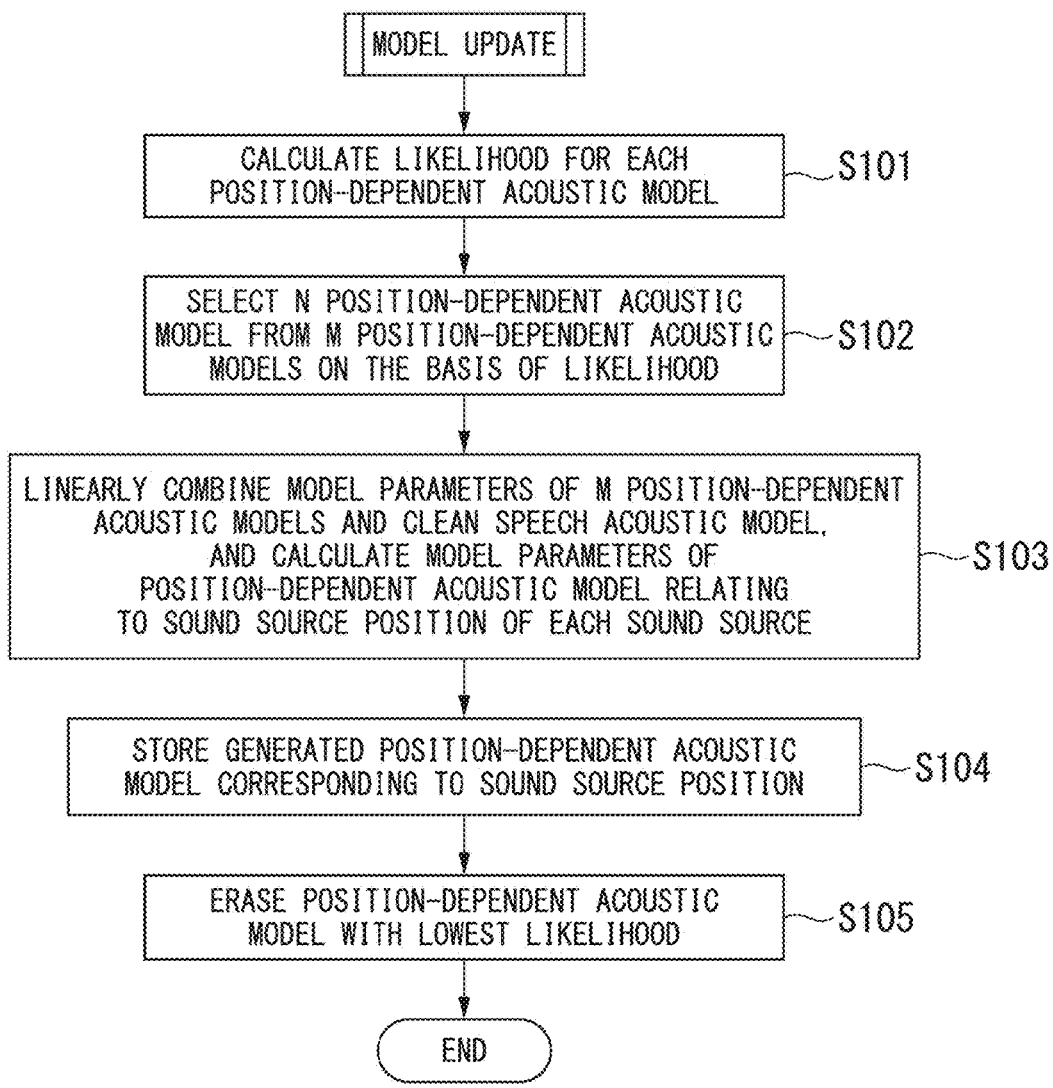
FIG. 5 is a flowchart showing acoustic model update processing according to the first embodiment.

FIG. 5 is a flowchart showing acoustic model update processing according to this embodiment.

(Step S101) The model update unit 110 calculates the likelihood for each of the M position-dependent acoustic models $\Psi^{(n)}$ and the clean speech acoustic model $\lambda^{(s)}$ stored in the model storage unit 109 with respect to the adjusted feature quantity [f'] of each sound source input from the adjustment factor multiplication unit 108. The model update unit 110 calculates a relative likelihood based on the likelihood of the clean speech acoustic model $\lambda^{(s)}$ from the likelihood of each of the position-dependent acoustic model $\Psi^{(n)}$. Thereafter, the process progresses to Step S102.

(Step S102) The model update unit 110 selects the position-dependent acoustic model $\Psi^{(n)}$ having the N (where N is an integer less than M and equal to or greater than 1, for example, 12)-th highest relative likelihood from the position-dependent acoustic model $\Psi^{(n)}$ with the highest relative likelihood among the M position-dependent acoustic models Wm.

Thereafter, the process progresses to Step S103.

(Step S103) The model update unit 110 linearly combines the model parameters of the selected N position-dependent acoustic models $\Psi^{(n)}$ and the clean speech acoustic model $\lambda^{(s)}$ to calculate new model parameters. With the calculated model parameters, a new position-dependent acoustic model $\lambda^{(upd)}$ relating to the sound source position n is defined. Here, as shown in Expressions (17) to (20), the model update unit 110 takes the total sum of multiplication values obtained by multiplying a mixture weighting factor $C_{im}$, a mean $[\mu_{im}]$, a covariance matrix $[\Sigma_{im}]$, and a transition probability $a_{ij}$ as the model parameters by the weighting factor $\gamma_{(n)}$ of each acoustic model between the selected N position-dependent acoustic models $\Psi^{(n)}$ and the clean speech acoustic model $\lambda^{(s)}$ to calculate a new mixture weighting factor $C_{im}^{(upd)}$, a mean $[\mu_{im}]^{(upd)}$, a covariance matrix $[\Sigma_{im}]^{(upd)}$, and a transition probability $a_{ij}^{(upd)}$.

$$C_{im}^{(upd)} = C_{im}^{(s)} + \sum_{n=1}^{N} \gamma_n C_{im}^{(n)} \quad (17)$$

$$[\mu_{im}^{(upd)}] = [\mu_{im}^{(s)}] + \sum_{n=1}^{N} \gamma_n [\mu_{im}^{(n)}] \quad (18)$$

$$[\Sigma_{im}^{(upd)}] = [\Sigma_{im}^{(s)}] + \sum_{n=1}^{N} \gamma_n [\Sigma_{im}^{(n)}] \quad (19)$$

$$a_{ij}^{(upd)} = a_{ij}^{(s)} + \sum_{n=1}^{N} \gamma_n a_{ij}^{(s)} \quad (20)$$

In the example shown in Expressions (17) to (20), the weighting factor $\gamma_{(n)}$ is a relative value when the weighting factor of the clean speech acoustic model $\lambda^{(s)}$ is 1. The weighting factor $\gamma_{(n)}$ has a larger value when the position-dependent acoustic model $\Psi^{(n)}$ has a higher relative likelihood, and has a smaller value when the position-dependent acoustic model $\Psi^{(n)}$ has a lower relative likelihood. For this reason, the new model parameters are calculated with importance attached thereto when the position-dependent acoustic model $\Psi^{(n)}$ has a higher relative likelihood. However, the influence (for example, the frequency band contributing to speech recognition) of reverberation different depending on the sound source position is mutually compensated for by taking the contribution of other position-dependent acoustic models $\Psi^{(n)}$ into consideration.

The model update unit 110 generates a position-dependent acoustic model $\lambda^{(upd)}$ with the calculated mixture weighting factor $C_{im}^{(upd)}$, the mean $[\mu_{im}]^{(upd)}$, the covariance matrix $[\Sigma_{im}]^{(upd)}$, and the transition probability $a_{ij}^{(upd)}$ as the model parameters. Thereafter, the process progresses to Step S104.

(Step S104) The model update unit 110 stores the generated position-dependent acoustic model $\lambda^{(upd)}$ in the model storage unit 109 as the position-dependent acoustic model $\Psi^{(n)}$ relating to the sound source position (x,y) of the sound source. Thereafter, the process progresses to Step S105.

(Step S105) The model update unit 110 erases the position-dependent acoustic model $\Psi^{(n)}$ with the lowest relative likelihood from the model storage unit 109. With this, the total number of position-dependent acoustic models $\Psi^{(n)}$ is kept constant. Thereafter, the processing shown in FIG. 5 ends.

In the processing shown in FIG. 5, the model update unit 110 may calculate new model parameters using the N position-dependent acoustic models $\Psi^{(n)}$ without using the clean speech acoustic model $\lambda^{(s)}$. However, the model update unit 110 uses the model parameters relating to the clean speech acoustic model $\lambda^{(s)}$ generated without being affected by reverberation, thereby using all frequency components included in the speech signal as the key of speech recognition. Furthermore, the model update unit 110 may omit the processing of Step S105, thereby allowing an increase in the total number of position-dependent acoustic models $\Psi^{(n)}$.

(Speech Processing)

Figure 6:
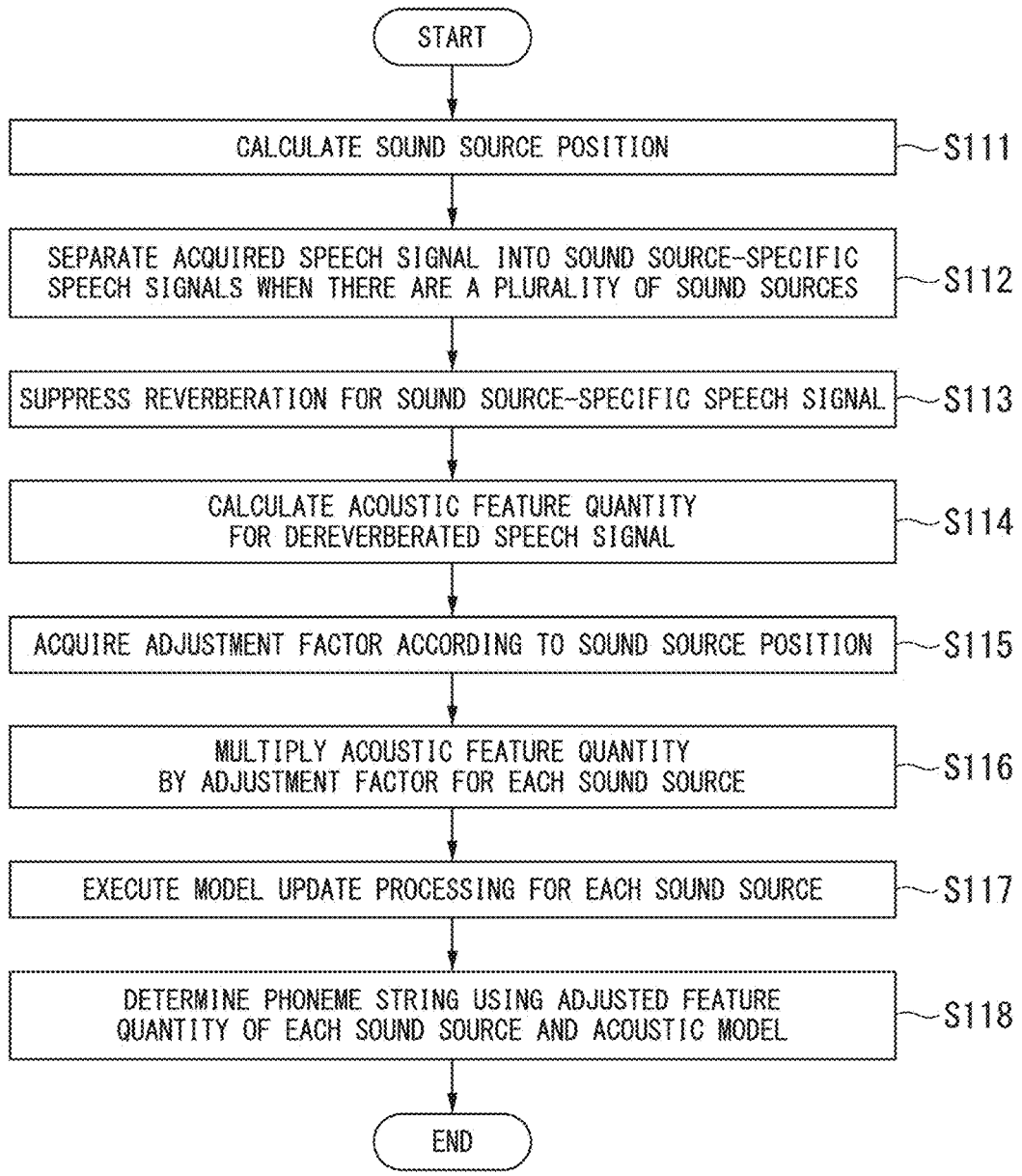
FIG. 6 is a flowchart showing speech processing according to the first embodiment.

Next, speech processing according to this embodiment will be described. FIG. 6 is a flowchart showing speech processing according to this embodiment.

(Step S111) The sound source localization unit 101 calculates the sound source position using the speech signal of the P channels acquired by the sound pickup unit 12. Thereafter, the process progresses to Step S112.

(Step S112) The sound source separation unit 102 determines whether or not the number of sound sources whose sound source position is determined by the sound source localization unit 101 is greater than 1. When the number of sound sources is greater than 1, the sound source separation unit 102 separates the speech signal of the P channels into the sound source-specific speech signals on the basis of the sound source positions. When the number of sound sources is one, the sound source separation unit 102 determines one component of the speech signal of the P channels, for example, a speech signal of a channel with the highest speech level as the sound source-specific speech signal of the sound source. Thereafter, the process progresses to Step S113.

(Step S113) The reverberation suppression unit 103 suppresses a reverberation component for the sound source-specific speech signal of each sound source to generate a dereverberated speech signal. Thereafter, the process progresses to Step S114.

(Step S114) The feature quantity calculation unit 104 generates the acoustic feature quantity for the dereverberated speech signal of each sound source. Thereafter, the process progresses to Step S115.

(Step S115) The adjustment factor acquisition unit 107 acquires the adjustment factor corresponding to the sound source position of each sound source with reference to adjustment data stored in the adjustment data storage unit 106. Thereafter, the process progresses to Step S116.

(Step S116) The adjustment factor multiplication unit 108 multiplies the acoustic feature quantity of each sound source by the adjustment factor corresponding to the sound source position of the sound source to calculate the adjusted feature quantity of the sound source. Thereafter, the process progresses to Step S117.

(Step S117) The model update unit 110 performs the model update processing (FIG. 5) on the adjusted feature quantity of each sound source calculated by the adjustment factor multiplication unit 108. Thereafter, the process progresses to Step S118.

(Step S118) The speech recognition unit 111 determines the phoneme string using the position-dependent acoustic model generated for each sound source with respect to the adjusted feature quantity of each sound source. The speech recognition unit 111 generates recognition data representing a sentence to be a recognition result using a predetermined language model with respect to the phoneme string determined for each sound source. Thereafter, the processing shown in FIG. 6 ends.

(Influence of Reverberation)

Figure 7:
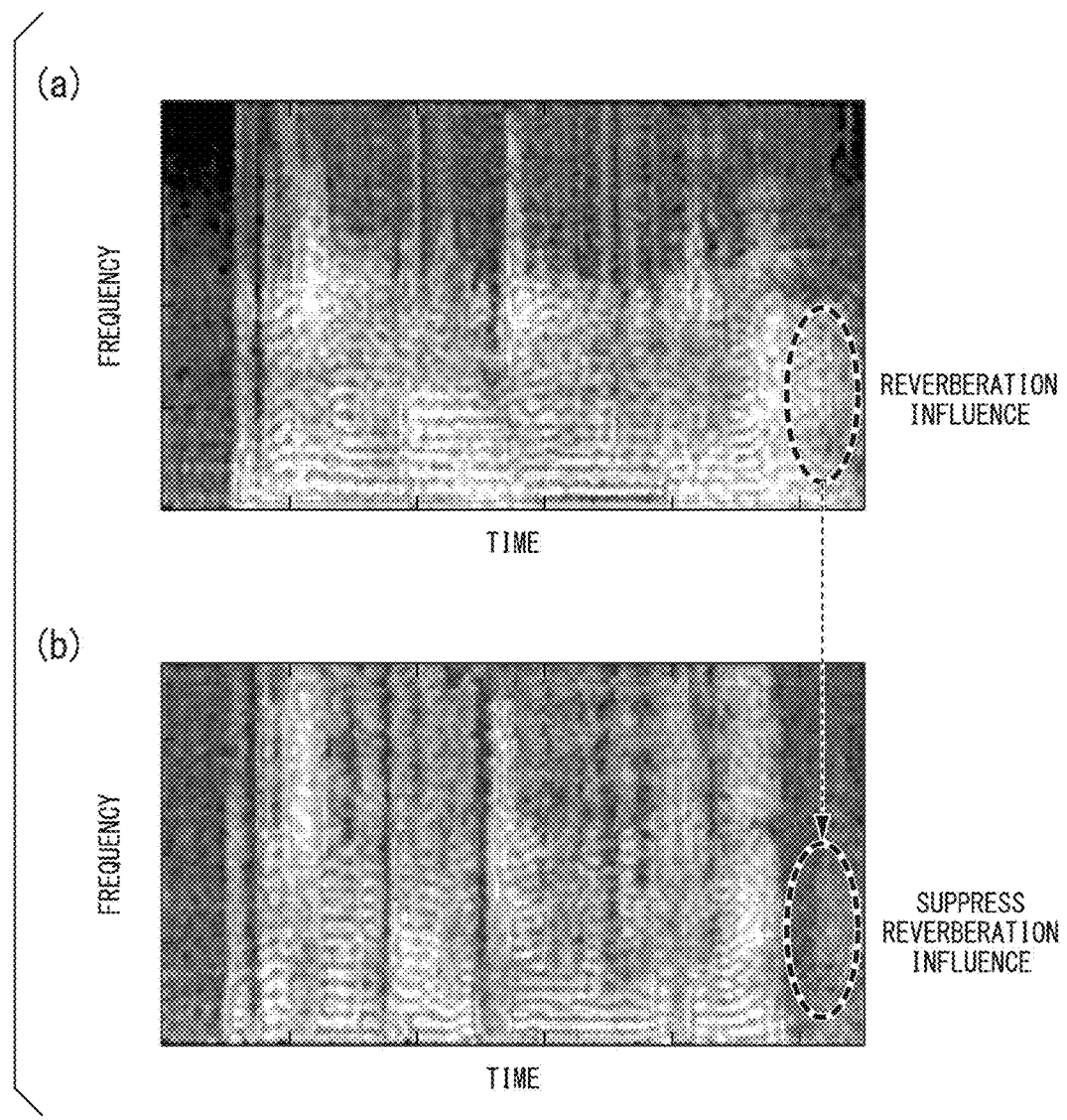
FIG. 7 shows an example of a spectrogram of a speech signal.

Next, the influence of reverberation will be described. FIG. 7 shows an example of a spectrogram of a speech signal. In parts (a) and (b) of FIG. 7, the vertical axis and the horizontal axis respectively indicate a frequency and a time. In parts (a) and (b) of FIG. 7, the range of the frequency is 0 to 8 kHz, and the period is 0 to 2.7 seconds. Furthermore, the magnitude of power is represented by shade. A bright portion indicates that power is large, and a dark portion indicates that power is low.

Part (a) of FIG. 7 shows a spectrogram of a speech signal recorded under reverberation during the utterance of a certain speaker. Part (b) of FIG. 7 shows a spectrogram of a dereverberated speech signal generated by the reverberation suppression unit 103 with respect to the speech signal shown in part (a) of FIG. 7. When comparing parts (a) and (b) of FIG. 7, in part (a) of FIG. 7, power is higher than in part (b) of FIG. 7 as a whole, and a portion where power is high is continued. In particular, power in the frequency band and the period surrounded by a broken line shown in part (a) of FIG. 7 is almost suppressed in the example shown in part (b) of FIG. 7. This is because, in this period, utterance is stopped, and a reverberation component is exclusively recorded.

Figure 8:
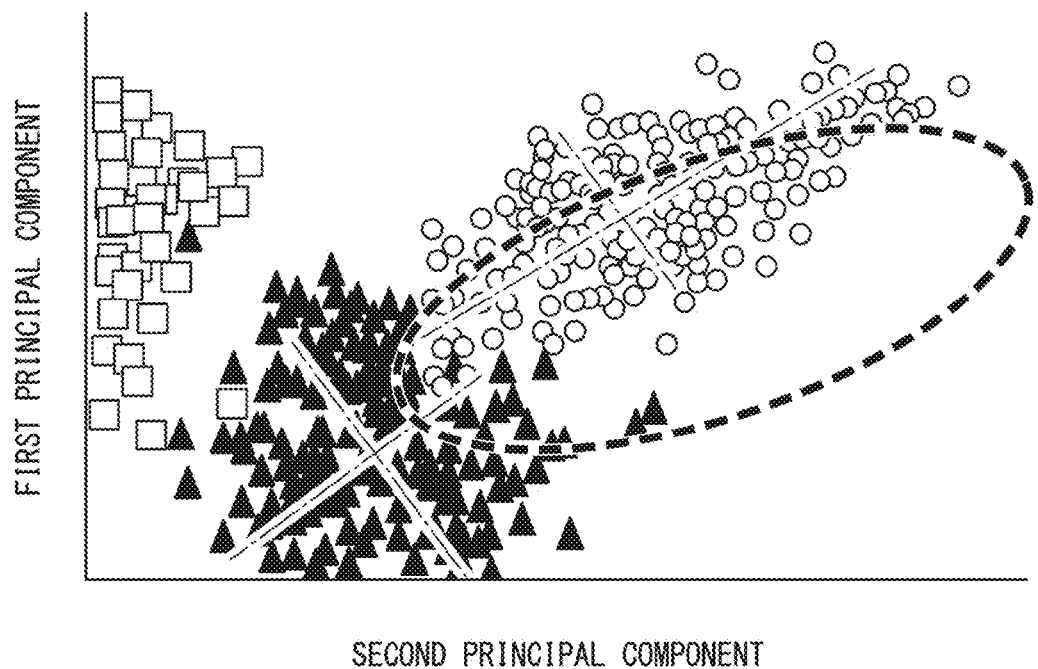
FIG. 8 is a diagram showing a distribution example of adjusted feature quantities.

FIG. 8 is a diagram showing a distribution example of adjusted feature quantities. In FIG. 8, the vertical axis and the horizontal axis respectively indicates the degree of contribution of a first principal component and the degree of contribution of a second principal component. The first principal component and the second principal component are two eigenvector obtained by performing principal component analysis (PCA) on a set of adjusted feature quantities for a speech signal of speech incoming from a certain sound source position (a,b). That is, the first principal component and the second principal component are two components which can be the most illustrative of a change in the adjusted feature quantity of the speech signal from the sound source position (a,b). The degree of contribution of the first principal component and the degree of contribution of the second principal component are represented given by the inner product of the adjusted feature quantity and the first principal component and the inner product of the adjusted feature quantity and the second principal component. With the use of the degree of contribution of the first principal component and the degree of contribution of the second principal component, various adjusted feature quantities or an acoustic feature quantity distribution is represented on a two-dimensional plane.

In FIG. 8, a portion surrounded by a broken line indicates a distribution D1 of adjusted feature quantities based on the speech signal from the sound source position (a,b). In the following discussion, the distribution D1 is assumed as a target distribution. In contrast, a distribution of symbol ○ indicates a distribution D2 of adjusted feature quantities obtained through the acoustic model update processing in the model update unit 110 and the adjustment of the acoustic feature quantity in the feature quantity adjustment unit 105. A distribution of symbol ▲ indicates a distribution D3 of adjusted feature quantities obtained through the adjustment of the acoustic feature quantity in the feature quantity adjustment unit 105 without performing the acoustic model update processing. A distribution of symbol □ indicates a distribution D4 of acoustic feature quantities obtained without performing reverberation suppression in the reverberation suppression unit 103, the acoustic model update, and the adjustment of the acoustic feature quantity. In the example shown in FIG. 8, the distribution D4 is deviated from not only the distribution D1 but also the distributions D2 and D3. The distribution D3 is closer to the distribution D1 than the distribution D4 and overlaps a part of the peripheral portion of the distribution D1. The distribution D2 is closer to the distribution D1 than the distribution D3 and overlaps a substantially half region of the distribution D1. This indicates that the speech recognition accuracy is improved by reducing the deviation between the acoustic feature quantity relating to the generation of the acoustic model and the acoustic feature quantity in the speech recognition processing through the suppression of the reverberation component and the adjustment of the acoustic feature quantity. Furthermore, this indicates that the speech recognition accuracy is improved by further reducing the deviation through the acoustic model update processing.

As described above, the speech processing device 10 according to this embodiment includes the sound source localization unit 101 which determines a sound source position from acquired speech, the reverberation suppression unit 103 which suppresses the reverberation component of speech to generate dereverberated speech, and the feature quantity calculation unit 104 which calculates the acoustic feature quantity of dereverberated speech.

The speech processing device 10 includes the feature quantity adjustment unit 105 which multiplies the acoustic feature quantity by the adjustment factor corresponding to the sound source position to calculate the adjusted feature quantity, and the speech recognition unit 111 which performs speech recognition using the adjusted feature quantity.

With this configuration, speech recognition is performed using the adjusted feature quantity calculated by multiplying the feature quantity of dereverberated speech with the reverberation component suppressed by the adjustment factor according to the sound source position. Since the sound source position dependence of the influence of reverberation is relaxed, it is possible to suppress decrease of the speech recognition rate due to a change in sound source position under reverberation.

In the speech processing device 10, the adjustment factor is calculated in advance such that the likelihood which is calculated by using the adjusted feature quantity calculated by multiplying the acoustic feature quantity the adjustment factor becomes higher than the likelihood calculated by using the acoustic feature quantity.

With this configuration, the adjusted feature quantity obtained by multiplying the feature quantity of dereverberated speech by the adjustment factor, whereby it is possible to make the likelihood for each phoneme higher than the feature quantity of dereverberated speech. For this reason, it is possible to suppress decrease of a speech recognition rate due to a change in sound source position under reverberation.

The speech processing device 10 includes the model update unit 110 which selects a predetermined number of position-dependent acoustic models on the basis of the likelihood calculated by using the adjusted feature quantity and the position-dependent acoustic model of each sound source position and linearly combines the model parameters of the selected position-dependent acoustic model to generate a position-dependent acoustic model corresponding to the sound source position. The speech recognition unit 111 performs speech recognition using the acoustic model generated by the model update unit 110.

With this configuration, the selection of a position-dependent acoustic model having a low likelihood significantly deteriorating speech recognition accuracy is avoided, and the model parameters of the selected position-dependent acoustic model are linearly combined, whereby a frequency component with no influence of reverberation which may vary between sound source positions in generating a position-dependent acoustic model is compensated for. For this reason, the generated position-dependent acoustic model is used in speech recognition, whereby it is possible to suppress decrease of a speech recognition rate due to a change in sound source position under reverberation.

In the speech processing device 10, the model update unit 110 linearly combines the model parameters of the acoustic model using clean speech to generate the position-dependent acoustic model corresponding to the sound source position determined by the sound source localization unit 101.

With this configuration, the model parameters of the acoustic model generated using clean speech are further linearly combined, a frequency component with no influence of reverberation is compensated for. For this reason, the generated position-dependent acoustic model is used in speech recognition, whereby it is possible to suppress decrease of a speech recognition rate due to a change in sound source position under reverberation.

In the speech processing device 10, the model update unit 110 eliminates the position-dependent acoustic model with the likelihood lower than the predetermined likelihood.

With this configuration, since the position-dependent acoustic model is updated such that a likelihood is not lowered according to a change in sound source position, it is possible to suppress decrease of a speech recognition rate due to a change in sound source position under reverberation.

Second Embodiment

Next, a second embodiment of the invention will be described. The same configurations as those in the first embodiment are represented by the same reference numerals, and description thereof will not be repeated. FIG. 9 is a block diagram showing the configuration of a speech processing system 2 according to this embodiment.

The speech processing system 2 includes a speech processing device 10, a sound pickup unit 12, an operation control unit 27, a speech reproduction unit 28, and an operation mechanism unit 29. That is, the speech processing system 2 further includes the operation control unit 27, the speech reproduction unit 28, and the operation mechanism unit 29 compared to the speech processing system 1. The speech processing system 2 is constituted as, for example, a robot having an interaction function.

The operation control unit 27 causes the speech reproduction unit 28 or the operation mechanism unit 29 to execute an operation according to utterance recognized in the speech recognition unit 111 of the speech processing device 10. The operation control unit 27 includes a storage unit 271, an operation determination unit 272, and a speech synthesis unit 273.

The storage unit 271 stores operation data in advance. Operation data is data in which recognition data indicating an utterance sentence of a user determined in advance corresponds to control data indicating control parameters for controlling the operation mechanism unit 29. For example, data for instructing an operation (for example, walking) of the robot as recognition data corresponds to data representing control parameters (for example, power for driving a motor of a leg portion) when the operation mechanism unit 29 executes the operation. Operation data also includes interaction data. Interaction data is data in which recognition data corresponds to utterance data indicating a speech sentence as control data. An example of interaction data will be described.

The operation determination unit 272 searches the storage unit 271 for operation data which includes recognition data indicating an utterance sentence the same as or similar to a part or the whole of a sentence indicated by recognition data input from the speech processing device 10. For example, the operation determination unit 272 determines an utterance sentence having the hamming distance from a sentence indicated by input recognition data smaller than a predetermined distance threshold as an utterance sentence similar to the sentence indicated by input recognition data. When the searched operation data is interaction data, the operation determination unit 272 outputs interaction data to the speech synthesis unit 273. When the searched operation data is not interaction data, the operation determination unit 272 determines to be operation data for motion control and outputs operation data to the operation mechanism unit 29.

The speech synthesis unit 273 performs text speech synthesis processing on an utterance sentence indicated by utterance data of interaction data input from the operation determination unit 272 and generates a speech signal relating to utterance speech representing the utterance sentence. The speech synthesis unit 273 outputs the generated speech signal to the speech reproduction unit 28.

The speech reproduction unit 28 reproduces speech on the basis of the speech signal input from the speech synthesis unit 273. The speech reproduction unit 28 includes, for example, a loudspeaker.

The operation mechanism unit 29 executes a predetermined operation on the basis of the control parameters indicated by operation data input from the operation determination unit 272. For example, the operation mechanism unit 29 receives the power supply instructed as a control parameter and drives the motor provided in the leg portion to realize walking.

(Example of Interaction Data)

Next, an example of interaction data will be described. FIG. 10 is a diagram showing an example of interaction data.

In interaction data shown in FIG. 10, Sp1 is recognition data, and Sp2 is utterance data. Sp1 indicates a sentence, "HI, I WENT TO A SUSHI RESTAURANT AND ATE AYU. HOW DO YOU SAY AYU IN ENGLISH?". In Sp1, an underlined portion is a portion which can be replaced with other phrases, and is neglected for determining matching with or similarity to input recognition data. In FIG. 10, "AYU" in Sp1 can be replaced with the names of other kinds of fish in Japanese. For example, if it is assumed that recognition data indicating "HI, I WENT TO A SUSHI RESTAURANT AND ATE MAGURO. HOW DO YOU SAY MAGURO IN ENGLISH?" is input from the speech recognition unit 111, the operation determination unit 272 searches interaction data including recognition data of Sp1. Then, the operation determination unit 272 detects "MAGURO" instead of "AYU" as the name of fish in Japanese which is a neglected portion in the sentence indicated by input recognition data.

Sp2 indicates a sentence, "IT'S SWEETFISH.". In Sp2, an underlined portion is a portion which is replaced with a phrase detected in Sp1. The operation determination unit 272 specifies the name "TUNA" in English corresponding to the detected phrase "MAGURO" with reference to word dictionary data stored in advance in the storage unit 271. The operation determination unit 272 substitutes the specified phrase "TUNA" into the portion "SWEETFISH" in utterance data of Sp2 included in the searched interaction data, and outputs the substituted utterance data to the speech synthesis unit 273. Then, the speech synthesis unit 273 synthesizes a speech signal indicating the utterance, "IT'S TUNA", and outputs the synthesized speech signal to the speech reproduction unit 28.

(Arrangement of Sound Pickup Unit)

In an example shown in FIG. 11, the sound pickup unit 12 includes P (in the example shown in the drawing, seven) sound pickup elements 12-1 to 12-7 arranged in a head portion of the speech processing system 2 constituted as a robot Rt. The sound pickup elements 12-1 to 12-7 are arranged in different directions from a center C on two concentric circles different in radius. With this, it is possible to acquire sound incoming from all directions within a plane and to specify sound sources. The sound pickup elements 12-1, 12-4, and 12-7 are arranged on one circle, and the sound pickup elements 12-2, 12-3, 12-5, and 12-6 are arranged on the other circle.

(Operation Verification)

Next, an example of operation verification of the speech processing system 2 according to this embodiment will be described.

The operation verification is performed in each of four laboratories 1 to 4. The planar size of each of the laboratories 1 to 4 is 4.8 m×5.5 m. The reverberation times (RT) of the laboratories 1, 2, 3, and 4 are respectively 80 ms, 240 ms, 900 ms, and 940 ms. In each of the laboratories 1 to 4, an air conditioner and a computer are installed and cause background noise, and the signal to noise ratio is about 20 dB.

Figure 12:
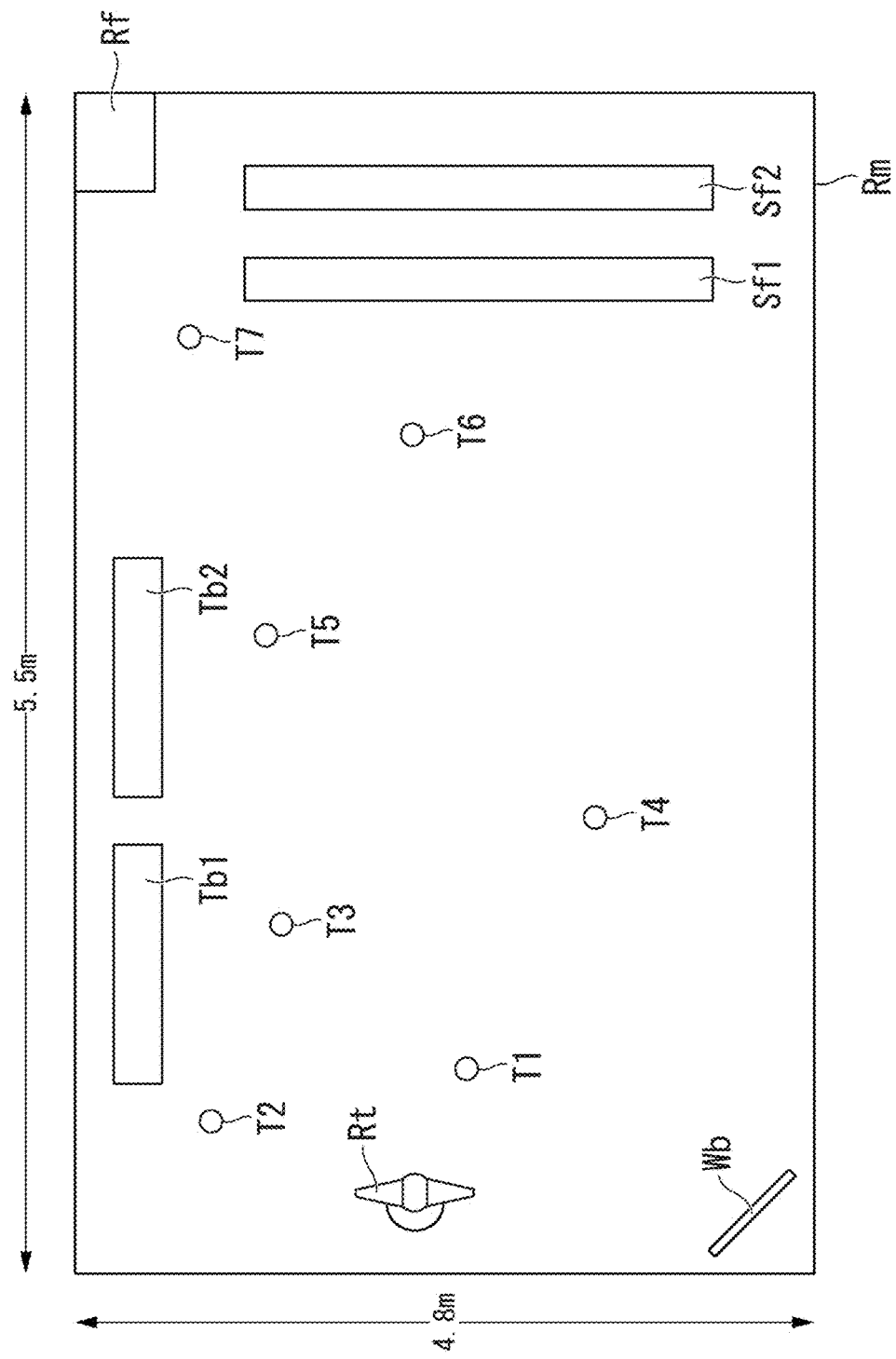
FIG. 12 is a plan view of a laboratory for operation verification of the second embodiment.

FIG. 12 is a plan view of the laboratory 4. As shown in FIG. 12, seven sound source positions T1 to T7 are set in each laboratory. In the laboratories 1 to 4, the positional relationship between the speech processing system 2 constituted as the robot Rt and the sound source positions T1 to T7 is the same. The distance to the robot Rt increases in order of the sound source positions T1 to T7. Of these, the distance from the sound source position T1 is the smallest, and the distance from the sound source position T7 is the largest. The robot Rt is a humanoid bipedal robot whose degree of freedom is 20. In the laboratory 4, as shown in FIG. 12, fixtures, such as tables Tb1 and Tb2, sofas Sf1 and Sf2, a whiteboard Wb, and a refrigerator Rf, are installed. These fixtures are arranged at positions where speech propagating between the sound source positions T1 to T7 and the robot Rt is not blocked.

As a clean speech database used for generating adjustment data and the position-dependent acoustic model $\Psi^{(n)}$, a speech corpus of Newspaper Article Sentences of each of Japanese and English is used. Specifically, Japanese Newspaper Article Sentences (JNAS) corpus and World Street Journal corpus are used.

In this operation verification, experiments were conducted for both of automatic speech recognition (ASR) and spoken language understanding (SLU). In the experiment relating to the automatic speech recognition, ten speakers who speak Japanese as a mother tongue and ten speakers who speak English as a mother tongue utter 20 times at one of the sound source positions T1 to T7. The content of utterance is a given content prepared as an article in advance. While (1) continuous speech recognition is executed at a position where the speaker is close to the robot Rt, (2) word detection and utterance detection (Voice Activity Detection (VAD)) are executed at a position where the speaker is kept away from the robot Rt. In the automatic speech recognition, for example, the presence or absence of occurrence of an insertion error and a deletion error is verified. The insertion error is a recognition error that a phoneme which has not been uttered is inserted. The deletion error is a recognition error that a phoneme which has been uttered is neglected.

In the experiment relating to the spoken language understanding, in a sentence obtained through speech recognition processing, the capability of neglecting insignificant information as the speech processing system 2 constituted as the robot Rt and extracting significant information is verified. The experiment is performed with a conversation in a sushi restaurant as an example. In this example, a speaker utters questions relating to various kinds of fish for use in sushi or sashimi as representative Japanese foods to the speech processing system 2. In the speech processing system 2, for example, interaction data shown in FIG. 10 is used, whereby the name of fish is specified using reverberant speech generated at an arbitrary position. Accordingly, the speech processing system 2 recognizes the content of utterance through speech recognition processing and translates the recognized name of fish in Japanese or English to the name of fish in English or Japanese.

The form of the uttered questions is a free form. That is, the speaker asks the questions freely, and the speech processing system 2 extracts the name of fish from the content of utterance. However, in order to unify the contents of the questions among the speakers, an article created in advance is used. The question form is put in the content of the article.

In this operation verification, an interaction scenario including the following content is used.

(a) The speech processing system 2 understands the question of the speaker in Japanese or English.

(b) An experiment relating to continuous speech recognition and an experiment (described below) relating to simple utterance detection are executed separately according to the distance between the speech processing system 2 and the speaker.

(c) In the utterance detection, the speaker comes close to the speech processing system 2 and asks the question for confirmation, and the speech processing system 2 detects speech.

(d) In the continuous speech recognition, the speech processing system 2 translates the name of fish.

(e) The speech processing system 2 controls the volume level of speech reproduced on the basis of utterance data according to the distance from the speaker as a sound source. The speech reproduction unit 28 controls the volume level such that power of a speech signal to be reproduced is in proportion to the square of the distance.

Next, the result of this operation verification will be described. This operation verification is performed using the following methods A to E. The method A is a method in which the suppression of the reverberation component is performed in the reverberation suppression unit 103 of the speech processing system 2, and the acoustic model update processing in the model update unit 110 and the adjustment of the acoustic feature quantity in the feature quantity adjustment unit 105 are not performed. The method B is a method in which the suppression of the reverberation component is performed in the reverberation suppression unit 103, and speech recognition is performed using an acoustic model generated by performing maximum likelihood linear regression (MLLR) adaptation in advance. In the MLLR adaptation, an acoustic model is generated such that a likelihood is maximized for a speaker at each of the sound source positions T1 to T7. Accordingly, in the discussion of the verification result, the result of the method B is handled as an ideal result. The method C (the method according to this embodiment) is a method in which the suppression of the reverberation component is performed in the reverberation suppression unit 103, the acoustic model updating processing in the model update unit 110 and the adjustment of the acoustic feature quantity in the feature quantity adjustment unit 105 are performed to perform speech recognition. The method D (the method in the related art) is a method in which speech recognition is performed while suppressing the reverberation component on the basis of linear prediction (LP). The method E is a method in which speech recognition is performed without performing the elimination of the reverberation component, the acoustic model update processing, and the adjustment of the acoustic feature quantity.

(Continuous Speech Recognition)

Figure 13A:
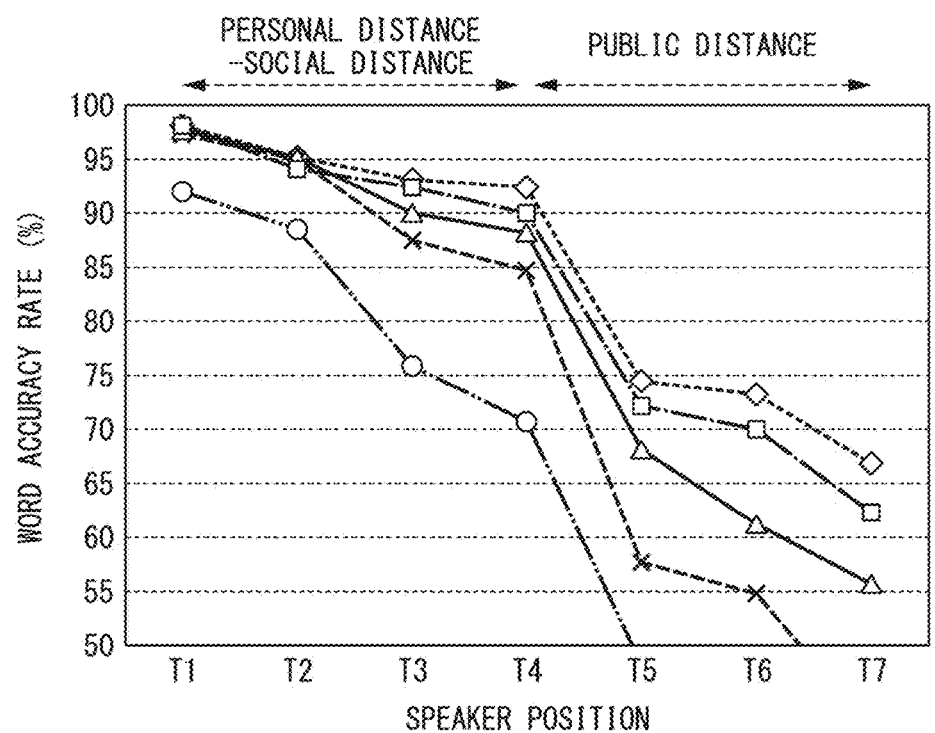
FIG. 13A is a diagram showing an example of an experimental result of continuous speech recognition.
Figure 13B:
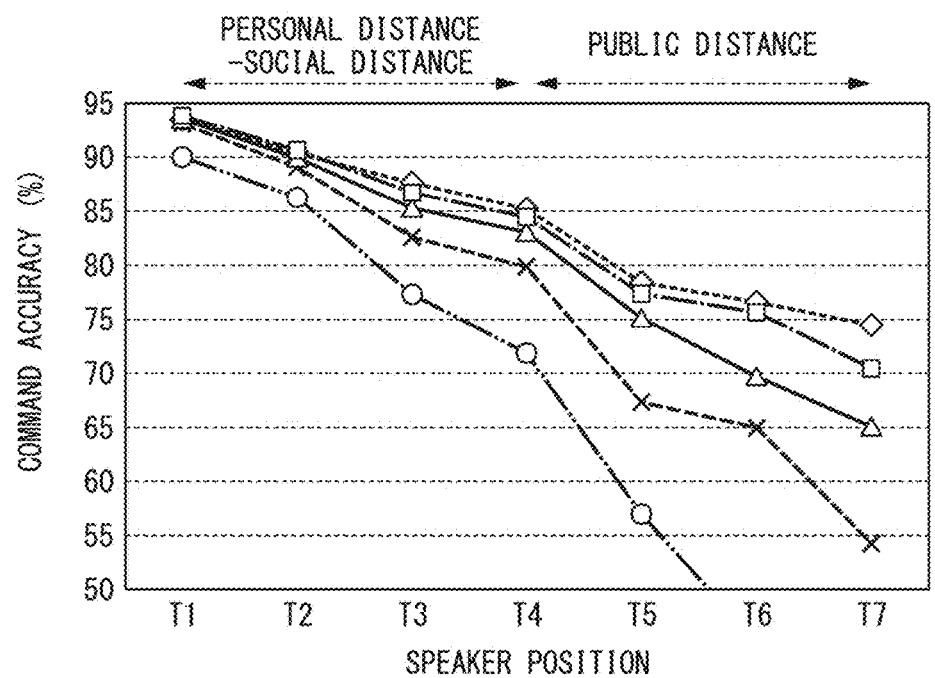
FIG. 13B is a diagram showing an example of an experimental result of continuous speech recognition.

FIGS. 13A and 13B are diagrams showing experimental results of continuous speech recognition. The experimental results of FIGS. 13A and 13B include the experimental results obtained in the laboratories 1 to 4. In FIGS. 13A and 13B, the results of the methods A, B, C, D, and E are respectively indicated by symbols ∆, ◊, □, x, and ○. In FIG. 13A, the vertical axis and the horizontal axis respectively indicate a word accuracy rate and the sound source positions T1 to T7. In FIG. 13B, the vertical axis and the horizontal axis respectively indicate a command accuracy rate (Understood Command) and the sound source positions T1 to T7. The upper sides of FIGS. 13A and 13B show to which of "personal distance", "social distance", and "public distance" the distance between the speech processing system 2 and each sound source position belongs. The three classifications are classifications according to the inter-speaker distance in interpersonal communication. The "personal distance" is a distance such that one speaker reach the other speaker by extending his/her arms. The "social distance" is a distance such that the speakers can communicate with each other and detailed expressions cannot be recognized. The "public distance" is a distance such that communication is not established. Of these, the "personal distance" is the smallest distance, and the "public distance" is the largest distance.

From the results shown in FIGS. 13A and 13B, the word accuracy rate and the command accuracy rate are high in order of the methods B, C, A, D, and E, and are high in order of the sound source positions T1 to T7. The word accuracy rate and the command accuracy rate are the highest in the method B, and are the second highest in the method C according to this embodiment.

In particular, at the sound source positions T5 to T7, the word accuracy rate and the command accuracy rate in the method C are significantly higher than the method D which has hitherto been used as a reverberation suppression method. The word accuracy rate and the command accuracy rate in the method C higher than those in the method A support suppression of decrease of the speech recognition accuracy due to the acoustic model update processing in the model update unit 110 and the adjustment of the acoustic feature quantity in the feature quantity adjustment unit 105. The methods B and C have no significant difference in the word accuracy rate and the command accuracy rate at the sound source positions T1 and T2. This indicates that, when the distance between the speaker and the speech processing system 2 belongs to the "personal distance" at which intimate communication is possible, in the method C, decrease of the speech recognition accuracy hardly occurs. Furthermore, it is found that the methods B and C have a significant difference in the word accuracy rate and the command accuracy rate at the sound source positions T3 to T7. The factor is that the number of utterances use for generating an acoustic model in the method B is 30 which is greater than the number of utterances (20) in the method C. As in the method B, a method which learns an acoustic model for each sound source position in advance cannot adapt to free movement of the speaker or a change in reverberation environment.

In the method C, the word recognition rate becomes 90% at any of the sound source positions T1 to T4 as the position of the speaker belonging to the "personal distance" and the "social distance". This indicates that it is useful as continuous speech recognition under reverberation. On the other hand, the word recognition rate is equal to or less than 75% at the sound source positions T5 to T7 belonging to the "public distance", and it is not useful as continuous speech recognition under reverberation. However, considering that communication is not established at such a distance, the speech processing system 2 may detect at least speech uttered by the speaker.

(Speech Detection)

The speech processing device 10 may include a speech detection unit (not shown) which performs speech detection processing on the sound source-specific speech signal of each sound source. For example, the speech detection unit counts the zero crossing of the sound source-specific speech signal at a predetermined time interval (for example, 50 ms), when the zero crossing is within a predetermined range (for example, 200 to 500/second) and the intensity of the sound source-specific speech signal exceeds a predetermined intensity threshold, determines that speech is detected, and otherwise, determines that speech is not detected. Furthermore, the speech recognition unit 111 may stop the processing relating to speech recognition on a sound source-specific speech signal relating to a sound source at an estimated distance exceeding a predetermined distance threshold (for example, 2 m), and may execute the processing relating to speech recognition on a sound source-specific speech signal of a sound source at a distance within the predetermined distance threshold.

FIG. 14 is a diagram showing a speech detection rate. The speech detection rate shown in FIG. 14 is a speech detection rate at each of the sound source positions T1 to T7. The speech detection rate is 100% at all of the sound source positions T1 to T4 and becomes lower in order of the sound source positions T5 to T7 but is equal to or greater than 97% at all of the sound source positions T5 to T7, and is thus sufficient for practical use. Accordingly, when the distance between the robot Rt in which the speech processing system 2 is mounted and the speaker is close within a range of the "personal distance" or the "social distance", the speech processing system 2 can resume the processing relating to speech recognition and can resume interaction with the speaker.

(Comparison with Related Art Method)

Next, the word recognition rate in the speech processing system 2 according to this embodiment is compared with the word recognition rate of a speech signal with a reverberation component suppressed by a reverberation suppression method of the related art. FIG. 15 is a diagram showing a word recognition rate according to each method. A method is shown in each row of FIG. 15, and a laboratory is shown in each column of FIG. 15.

Of the methods A to J, the method J is processing according to this embodiment. In the comparison of the results, a method described in a website "Reverb Challenge" (http://reverb2014.dereverberation.com) is used in common as processing relating to speech recognition, and the difference in a reverberation suppression method and acoustic model update processing is focused. Since the influence of reverberation is significant with an increasing distance from a sound source, data relating to the sound source positions T1 and T2 at a small distance to the speech processing system 2 is neglected.

According to the method J according to this embodiment, the word recognition rates in the laboratories 1, 2, and 3 are respectively 94.3%, 91.1%, and 90.2%. These word recognition rates are higher than the word recognition rates according to other methods A to I. Accordingly, in this embodiment, decrease of the speech recognition accuracy is suppressed by not only suppressing the reverberation component but also adjusting the acoustic feature quantity and updating the acoustic model.

The method A is a method which employs constrained MLLR (CMLLR) among the methods described in the following document, and the method B is a method (No CMLLR) which does not employ CMLLR.

Astudillo, R., Braun, S. and Habets, E. "A multichannel feature comparison approach for robust asr in noisy and reverberant environments" Workshop on Reverb Challenge, 2014

The method C is a method described in the following document, and corresponds to the method B of FIGS. 13A and 13B.

Yegnanarayana, B. and Satyaranyarana, P. "Enhancement of reverberant speech using 1 p residual signals", Proceedings of IEEE transactions on Audio, Speech and Language, 2000

The method D is a method described in the following document.

Palomlki, K. and Kallasjoki, H. "Reverberation robust speech recognition by matching distributions of spectrally and temporally decorrelated features", Proceedings Workshop on Reverb Challenge, 2014

The method E is a method described in the following document.

Griebel, S. and Brandstein, M. "Wavelet transform extrema clustering for multi-channel speech dereverberation", Proceedings Workshop on Reverb Challenge, 2014

The method F is a method which employs Constrained MLLR (CMLLR) among the methods described the following document, and the method G is a method (No CMLLR) which does not employ CMLLR.

Leng, T., Dennis, J., Ng, W. and Dat, T. "Pbf-gsc beamforming for asr and speech enhancement in reverberant environments", Proceedings Workshop on Reverb Challenge, 2014

The method H is a method described in the following document.

Xiao, X., Shengkui, Z., Nguyen, D. and Xionghu, Z. "The ntu-adsc systems for reverberation challenge 2014", Proceedings Workshop on Reverb Challenge, 2014

The method I is a method described in the following document.

Geiger, J., Marchi, E., Schuller, B. and Rigoll, G. "The tum system for the reverb challenge: Recognition of reverberated speech using multi-channel correlation shaping dereverberation and blstm recurrent neural networks", Proceedings Workshop on Reverb Challenge, 2014

As described above, according to the speech processing device 10, it is possible to suppress decrease of the speech recognition rate due to a change in sound source position under reverberation. The speech processing system 2 according to this embodiment includes the operation control unit 27 which executes an operation according to the utterance recognized by the speech recognition unit 111.

For this reason, since the operation according to the utterance recognized by the speech recognition unit 111 is executed, an operation desired by the user is more reliably instructed through utterance regardless of a change in sound source position under reverberation.

Third Embodiment

Next, a third embodiment of the invention will be described. The same configurations as those in the embodiments described above are represented by the same reference numerals, and description thereof will not be repeated.

Figure 16:
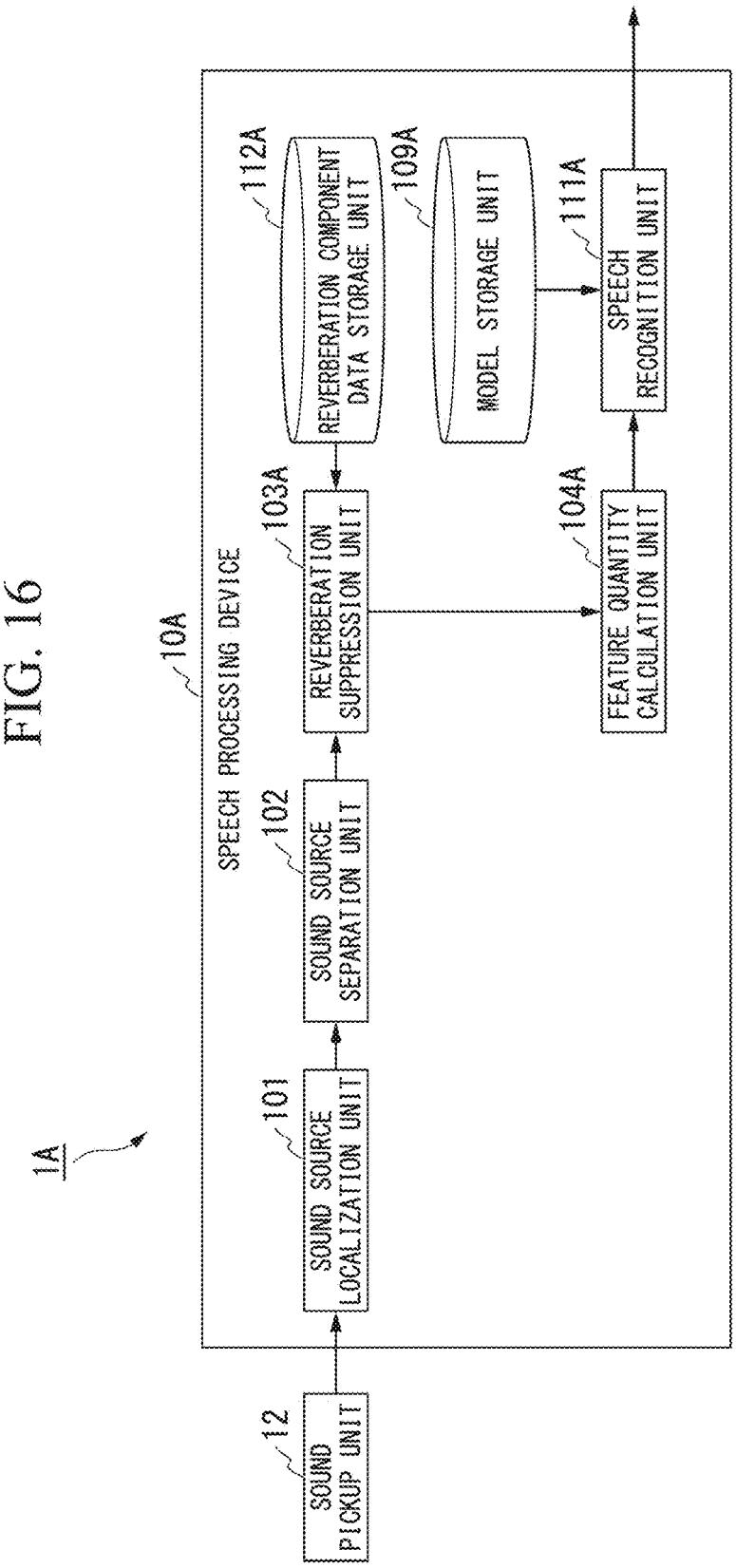
FIG. 16 is a block diagram showing the configuration of a speech processing system according to a third embodiment.

FIG. 16 is a block diagram showing the configuration of a speech processing system 1A according to this embodiment.

The speech processing system 1A according to this embodiment includes a sound pickup unit 12 and a speech processing device 10A. The speech processing device 10A includes a sound source localization unit 101, a sound source separation unit 102, a reverberation suppression unit 103A, a feature quantity calculation unit 104A, a model storage unit 109A, a speech recognition unit 111A, and a reverberation component data storage unit 112A.

The reverberation component data storage unit 112A stores a plurality of sets of reverberation component data for each acoustic environment in advance. Reverberation component data is data indicating a set of reverberation component factors $6b$ of each frequency band b, and generally depends on an acoustic environment. The acoustic environment means a variable element (acoustic perturbation) of the acoustic environment which affects a reverberation characteristic according to a room reverberation characteristic, the sound source position (x,y), and the like. The reverberation characteristic is represented by, for example, a room transfer function (RTF). A processing data generation unit 14A which generates reverberation component data offline will be described below. In the following description, a case where the acoustic environment includes sets of sound source positions and rooms is illustrated. The number of sound source positions relating to reverberation component data stored in the reverberation component data storage unit 112A is greater than 1 (for example, 15). The number of rooms is generally greater than 1 (for example, 4). In the following description, each set of each acoustic environment is distinguished using z. The number of sets of each acoustic environment is represented by Z (where Z is an integer equal to or greater than 1, for example, 15).

The reverberation suppression unit 103A performs reverberation suppression processing on the sound source-specific speech signal input from the sound source separation unit 102 using reverberation component data of each set z to generate a dereverberated speech signal. The reverberation suppression unit 103A generates the dereverberated speech signal using, for example, Expression (21) in the reverberation suppression processing.

$$|e'(\omega, j)|^2 = \begin{cases} |r(\omega, j)|^2 - \delta_b(z)|r(\omega, j)|^2 & (\text{if } |r(\omega, j)|^2 - \delta_b(z)|r(\omega, j)|^2 > 0) \\ \beta|r(\omega, j)|^2 & (\text{else}) \end{cases} \quad (21)$$

In Expression (21), e'(ω,j) and r(ω,j) respectively indicate frequency components in the frames j of the dereverberated speech signal and the sound source-specific speech signal. The sound source-specific speech signal corresponds to a reverberant speech signal which is a speech signal with reverberation according to the sound source position. The second term in the first row on the right side of Expression (21) indicates a reverberation component, specifically, a late reflection component. Accordingly, the first row on the right side of Expression (21) means that the reverberation component of each set z is subtracted from the frequency component of the sound source-specific speech signal to generate the frequency component of the dereverberated speech signal. β is an infinitesimal real number which is greater than 0 but is closer to 0 than 1. Accordingly, the second row on the right side of Expression (21) means that, when the value obtained by the first row on the right side is equal to or less than 0 (otherwise), a value obtained by multiplying the frequency component of the sound source-specific speech signal by an infinitesimal positive real number value is calculated as the frequency component of the dereverberated speech signal. With this, the occurrence of an abnormal value in the reverberation suppression processing is avoided. The reverberation suppression unit 103A outputs the dereverberated speech signal generated for each set z to the feature quantity calculation unit 104A.

The feature quantity calculation unit 104A calculates the acoustic feature quantity for the dereverberated speech signal of each set z input from the reverberation suppression unit 103A in a predetermined period (that is, frame). The acoustic feature quantity calculated by the feature quantity calculation unit 104A may be the same type of acoustic feature quantity as the acoustic feature quantity calculated by the feature quantity calculation unit 104 (FIG. 1) according to the above-described embodiment. The feature quantity calculation unit 104A outputs the acoustic feature quantity calculated for each set z to the speech recognition unit 111A.

The model storage unit 109A stores acoustic models and language models for use in speech recognition. The number of acoustic models stored in the model storage unit 109A may be at least one.

The speech recognition unit 111A performs processing relating to speech recognition on the acoustic feature quantity of each set z input from the feature quantity calculation unit 104A. Here, the speech recognition unit 111A calculates a likelihood for an utterance state string given from an acoustic feature quantity string having the input acoustic feature quantities with reference to the acoustic model stored in the model storage unit 109A for each set z. The speech recognition unit 111A selects an utterance state string relating to a set z' giving the highest likelihood among the likelihood calculated for each set z as shown in Expression (22).

$$z' = \underset{z}{\operatorname{argmax}}(P(f^{(r)}(\alpha(\omega, z)) | w)) \quad (22)$$

In Expression (22), P(f$^{(r)}$(α(ω,z))|w) indicates a likelihood for an utterance state string given from an acoustic feature quantity string obtained from the dereverberated speech signal relating to the set z.

f$^{(r)}$(α(ω,z)) indicates an acoustic feature quantity obtained from the dereverberated speech signal relating to the set z. α(ω,z) indicates a frequency component (described below) of a correction factor (temporal smearing filter) [α] calculated for the acoustic environment ξ relating to the set z. w indicates a phoneme string corresponding to the calculated utterance state string. The speech recognition unit 111A specifies phoneme strings corresponding to the selected utterance state string, calculates a likelihood of each candidate of a sentence represented by the phoneme strings among the specified phoneme strings on the basis of a language model stored in the model storage unit 109A, and outputs recognition data representing a sentence with the highest likelihood to the outside of the speech processing device 10A, for example, the operation control unit (FIG. 9).

In this way, according to the speech processing device 10A, the reverberation component speech signal with the reverberation component suppressed is obtained using reverberation component data of each set different according to the acoustic environment ξ, such as the sound source position or the room reverberation characteristic. Then, the phoneme strings corresponding to the utterance state string with the highest likelihood among the utterance state strings corresponding to the acoustic feature quantity string having the acoustic feature quantities calculated from the reverberation component speech signals are specified. For this reason, decrease of the speech recognition accuracy due to the difference in the influence of reverberation according to the acoustic environment ξ is suppressed.

In this embodiment, a speech processing system 2A (not shown) may be configured to include a speech processing device 10A, instead of the speech processing device 10 in the speech processing system 2 (FIG. 9).

(Processing Data Generation Unit)

Next, the configuration of the processing data generation unit 14A according to this embodiment will be described. The processing data generation unit 14A calculates a correction factor [α] using a speech signal recorded for each acoustic environment ξ, and generates reverberation component data in advance on the basis of the calculated correction factor [α] and a predetermined reverberation transfer function (offline processing).

Figure 17:
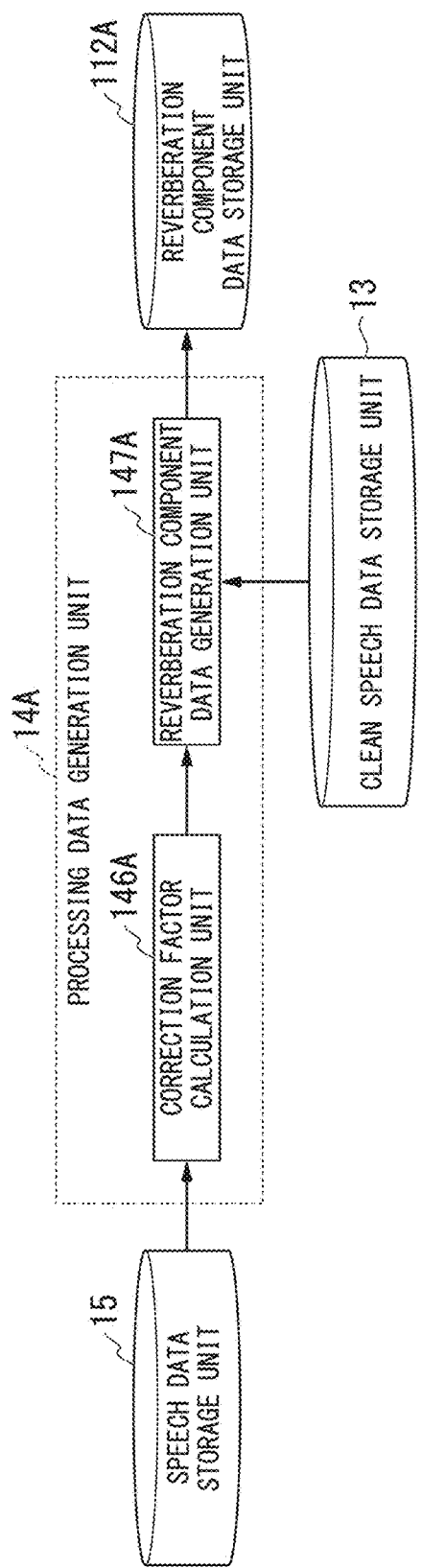
FIG. 17 is a block diagram showing a processing data generation unit according to the third embodiment.

FIG. 17 is a block diagram showing the processing data generation unit 14A according to this embodiment. The processing data generation unit 14A includes a correction factor calculation unit 146A and a reverberation component data generation unit 147A. The processing data generation unit 14A may be configured to include a speech data storage unit 15. The speech data storage unit 15 stores the reverberant speech signal recorded for each acoustic environment through the sound pickup unit 12. The stored reverberant speech signal gives a phoneme string representing a predetermined utterance content common between the acoustic environments ξ.

The correction factor calculation unit 146A acquires a reverberant speech signal r for each acoustic environment ξ from the speech data storage unit 15 and recursively calculates Z sets of the correction factors [α] which makes the likelihood calculated from the acquired reverberant speech signal higher. In general, there may be a plurality of utterance state strings which can be determined using the acoustic model for one acoustic feature quantity string having the acoustic feature quantities. Specifically, the correction factor calculation unit 146A performs processing described below.

The correction factor calculation unit 146A performs predetermined filter processing on the reverberant speech signal r using the correction factor [α] of each set z, and generates a corrected speech signal o. The predetermined filter processing is, for example, a convolution operation shown in Expression (23).

$$o[n] = \sum_{m=0}^{M-1} \alpha_m r[n-m] \qquad (23)$$

In Expression (23), n and m are indexes respectively indicating the samples of the reverberant speech signal r and the corrected speech signal o. m indicates an integer of 0 to M−1. M indicates a filter length, that is, the number of elements of the correction factor [α]. M may be a number sufficient for realizing RTF. That is, M may be equal to the number of samples corresponding to the reverberation time or may be greater than the number of samples. $\alpha_m$ indicates an element value of the correction factor [α]. That is, the correction factor [α] is a vector represented as $[\alpha_0, \alpha_1, \ldots, \alpha_{M-1}]^T$.

The correction factor calculation unit 146A calculates an acoustic feature quantity $f^{(o)}([\alpha])$ for the corrected speech signal o generated for each set similarly to the feature quantity calculation unit 104A.

The correction factor calculation unit 146A calculates the correction factor [α], which makes a likelihood Γ([α]) in Expression (24) higher, with respect to the acoustic feature quantity string having the acoustic feature quantities $f^{(o)}([\alpha])$ calculated for the sets.

$$\Gamma(\alpha) = \sum_j \log P(f_j^{(o)}(\alpha) \mid s_j) \qquad (24)$$

In Expression (24), $P(f_j^{(o)}([\alpha])|s_j')$ is an output probability which gives an utterance state $s_j$ on the basis of the same acoustic model stored in the model storage unit 109A for the acoustic feature quantity $f_j^{(o)}([\alpha])$ in the frame j. The utterance state $s_j$ is an utterance state which constitutes an utterance state string corresponding to a predetermined phoneme string w. Expression (24) indicates that the likelihood Γ([α]) is given by the total sum of the logarithmic values of the appearance probability between the frames j.

Making the likelihood Γ([α]) in Expression (24) higher is one requirement for maximizing a likelihood log $P(f_j^{(o)}([\alpha])|w)$ relating to the predetermined phoneme string w represented by Expression (25).

$$\alpha' = \underset{\alpha}{\mathrm{argmax}}(\log P(f^{(o)}(\alpha) \mid w)) \qquad (25)$$

With this, it is expected that a phoneme string w' with the highest likelihood log $P(f^{(o)}([\alpha'])|w)P(w)$ given by Expression (26) is obtained as a correct recognition result in online speech recognition processing.

$$w' = \underset{w}{\mathrm{argmax}}(\log(P(f^{(o)}([\alpha']) \mid w))P(w)) \qquad (26)$$

The correction factor calculation unit 146A uses, for example, a steepest gradient method for calculating the correction factor [α]. The steepest gradient method is a method which calculates an update amount proportional to a gradient $\nabla_{[\alpha]}\Gamma([\alpha])$ in a vector space spanned by the each element values of the correction factor [α] of the likelihood Γ(α) as index values, and successively repeats processing for adding the calculated update amount to the correction factor [α]. As shown in Expression (27), the gradient $\nabla_{[\alpha]}\Gamma([\alpha])$ is a vector having partial differentiations for the each element values of the likelihood Γ(α) as element values.

$$\nabla_{[\alpha]}\Gamma([\alpha]) = \left\{ \frac{\partial \Gamma([\alpha])}{\partial \alpha_0} \quad \frac{\partial \Gamma([\alpha])}{\partial \alpha_1} \quad \ldots \quad \frac{\partial \Gamma([\alpha])}{\partial \alpha_{M-1}} \right\} \qquad (27)$$

The acoustic model for use in calculating the likelihood Γ(α) is, for example, the HMM based on the GMM. The GMM is a statistical model representing the output probability of the utterance state by weighting and adding the normal distribution of the acoustic feature quantity as the base. Accordingly, the gradient $\nabla_{[\alpha]}\Gamma([\alpha])$ is represented by Expression (28).

$$\nabla_{[\alpha]}\Gamma([\alpha]) = -\sum_j \sum_{v=1}^{V} \gamma_{jv} \frac{\partial f_j^{(o)}([\alpha])}{\partial [\alpha]} \Sigma_{jv}^{-1}(f_j^{(o)}([\alpha]) - \mu_{jv}) \qquad (28)$$

In Expression (28), v is an index indicating the base. V indicates the number of bases used to represent the acoustic model. $\gamma_{jv}$, $\Sigma_{jv}$, and $\mu_{jv}$ respectively indicate a mixture weighting factor, a covariance matrix, and a mean of a base v relating to the frame j of the utterance state. $\partial f_j^{(o)}([\alpha])/\partial[\alpha]$ is a Jacobian matrix of the correction factor [α] of the acoustic feature quantity $f_j^{(o)}([\alpha])$. As shown in Expression (28), the gradient $\nabla_{[\alpha]}\Gamma([\alpha])$ becomes the total sum of $\gamma_{jv}$ obtained by multiplying the difference between the acoustic feature quantity $f_j^{(o)}([\alpha])$ and the mean $\mu_{jv}$ by an inverse matrix $\Sigma_{jv}^{-1}$, the Jacobian matrix, and the mixture weighting factor. This is because a derivative obtained by differentiating the normal distribution used as the base of the acoustic model with the acoustic feature quantity becomes a matrix obtained by multiplying the normal distribution by the inverse matrix $\Sigma_{jv}^{-1}$. In this way, the correction factor calculation unit 146A can calculate the update amount of the correction factor [α] through a product-sum operation between the bases. For this reason, a calculation amount required for calculating the update amount is comparatively small.

The correction factor calculation unit 146A repeats the calculation of the update amount and the update of the correction factor [α] based on the calculated update amount until the correction factor [α] converges to a predetermined value. The correction factor calculation unit 146A determines that the correction factor [α] converges when the absolute value of the update amount is equal to or less than a predetermined absolute value threshold, and determines that the correction factor [α] does not converge when the absolute value of the update amount exceeds the predetermined absolute value threshold.

The correction factor calculation unit 146A selects the correction factor [α] corresponding to the utterance state string with the highest likelihood Γ([α]) to the correction factor [α] corresponding to the utterance state string with the Z-th highest likelihood Γ([α]) among the correction factors [α] determined to converge. The correction factor calculation unit 146A outputs the Z sets of the correction factors [α] to the reverberation component data generation unit 147A.

The reverberation component data generation unit 147A performs predetermined filter processing on a predetermined RTF using the correction factor [α] of each set z input from the correction factor calculation unit 146A to calculate a corrected RTF. The filter processing is equivalent to processing for multiplying a frequency component $A(\omega,z)$ of the predetermined RTF by a frequency component of a correction factor $\alpha(\omega,z)$ to calculate a frequency component $A'(\omega,z)$ of the corrected RTF. The predetermined RTF is, for example, an RTF measured at a certain point in a room relating to the acoustic environment ξ of the set z.

The reverberation component data generation unit 147A acquires a clean speech signal c from the clean speech data storage unit 13 and calculates the reverberation component factor $\delta_b$ of the set z on the basis of the acquired clean speech signal c and the corrected RTF calculated for each set z. Specifically, the reverberation component data generation unit 147 performs the following processing to calculate the reverberation component factor $\delta_b$.

The reverberation component data generation unit 147A multiplies a frequency component $c(\omega,j)$ of the clean speech signal by the frequency component $A'(\omega,z)$ of the corrected RTF to calculate a frequency component $r(\omega,j)$ of the reverberant speech signal of the set z. The reverberation component data generation unit 147A calculates a frequency component $A^L(\omega,z)$ of a late reflection component in the corrected RTF which causes decrease of the speech recognition accuracy. Here, on an assumption that the corrected RTF is the sum of the early reflection component and the late reflection component, the reverberation component data generation unit 147A multiples the frequency component $c(\omega,j)$ of the clean speech signal by the frequency component $A^L(\omega,z)$ of the late reflection component to calculate a frequency component $l(\omega,j)$ of the late reflection speech signal. Accordingly, a frequency component $e(\omega,j)$ of the dereverberated speech signal obtained by subtracting the frequency component $l(\omega,j)$ of the late reflection speech signal from the frequency component $r(\omega,j)$ of the reverberant speech signal corresponds to a frequency component of the early reflection speech signal.

Next, as shown in Expression (29), the reverberation component data generation unit 147A calculates a mean square error $E_m$ which is the total sum of a square value of a residual error of the frequency component $l(\omega,j)$ of the late reflection speech signal and a value obtained by multiplying the reverberation component factor $\delta_b$ and the frequency component $r(\omega,j)$ of the reverberant speech signal. The reverberation component factor $\delta_b$ indicates the contribution rate of the frequency component $l(\omega,j)$ of the late reflection speech signal to the frequency component $r(\omega,j)$ of the reverberant speech signal.

$$E_m = \frac{1}{J} \sum_j \sum_{\delta_b \in B_q} |l(\omega, j) - \delta_b(\omega, j) r(\omega, j)|^2 \qquad (29)$$

In Expression (29), J indicates the total number of frames within a range in which the mean square error $E_m$ is calculated. $B_q$ indicates one of predetermined Q frequency bands.

The reverberation component data generation unit 147A calculates the reverberation component factor $\delta_b$ of each of the Q frequency bands so as to minimize the mean square error $E_m$ for each set z. The reverberation component data generation unit 147A generates reverberation component data indicating the reverberation component factor $\delta_b$ calculated for each set z and stores the generated reverberation component data in the reverberation component data storage unit 112A.

(Reverberation Component Data Generation Processing)

Next, reverberation component data generation processing (offline processing) according to this embodiment will be described.

Figure 18:
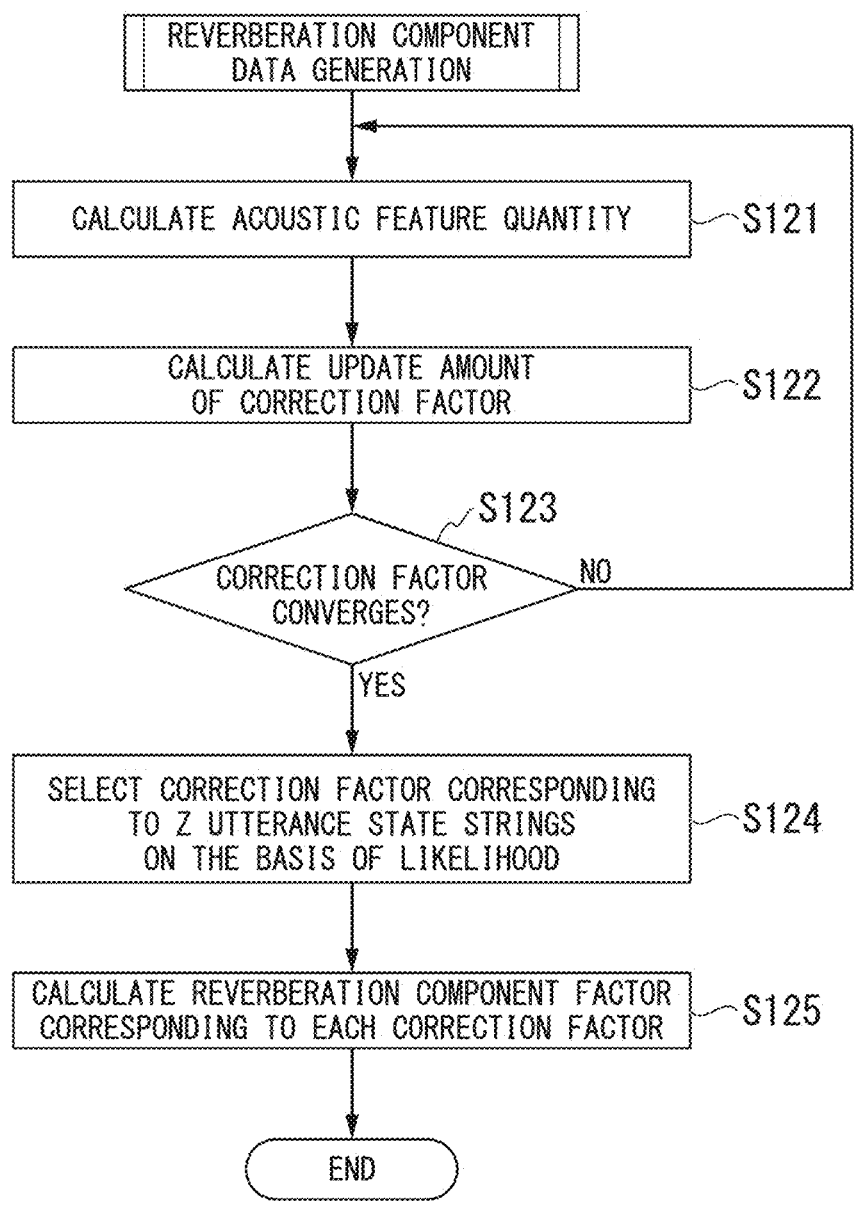
FIG. 18 is a flowchart showing reverberation component data generation processing according to the third embodiment.

FIG. 18 is a flowchart showing the reverberation component data generation processing according to this embodiment.

(Step S121) The correction factor calculation unit 146A performs predetermined filter processing on the reverberant speech signal r of each acoustic environment ξ using the correction factor [α] calculated for each set z to generate the corrected speech signal o. The correction factor calculation unit 146A calculates the acoustic feature quantity) $f^{(o)}([\alpha])$ for the generated corrected speech signal o. Thereafter, the process progresses to Step S122.

(Step S122) The correction factor calculation unit 146A calculates the gradient $\nabla_{[\alpha]}\Gamma([\alpha])$ of the likelihood for the acoustic feature quantity) $f^{(o)}([\alpha])$ using Expression (28) and calculates the update amount of the correction factor [α] proportional to the gradient $\nabla[\alpha]\Gamma([\alpha])$. The correction factor calculation unit 146A adds the calculated update amount to the likelihood Γ([α]) to update the correction factor [α]. Thereafter, the process progresses to Step S123.

(Step S123) The correction factor calculation unit 146A determines whether or not the correction factor [α] converges to a certain value on the basis of the absolute value of the update amount. When it is determined that the correction factor [α] converges (in Step S123, YES), the process progresses to Step S124. When it is determined that the correction factor [α] does not converge (in Step S123, NO), the process returns to Step S121.

(Step S124) The correction factor calculation unit 146A selects the correction factor [α] corresponding to the utterance state string with the highest likelihood Γ([α]) to the correction factor [α] corresponding the utterance state string with the Z-th highest likelihood Γ([α]) among the correction factors [α] determined to converge. Thereafter, the process progresses to Step S125.

(Step S125) The reverberation component data generation unit 147A performs the predetermined filter processing on the predetermined RTF using the correction factor [α] of each set z input from the correction factor calculation unit 146A to calculate the corrected RTF. The reverberation component data generation unit 147A generates the reverberant speech signal and the late reflection speech signal from the corrected RTF and the frequency component $A^L(\omega,z)$ of the late reflection speech signal in the correct RTF. The reverberation component data generation unit 147A calculates the reverberation component factor $\delta_b$ minimizing mean square error $E_m$ calculated by using Expression (29) from the generated reverberant speech signal and late reflection speech signal. The reverberation component data generation unit 147A stores reverberation component data indicating the reverberation component factor $\delta_b$ calculated for each set z in the reverberation component data storage unit 112A.

(Speech Processing)

Figure 19:
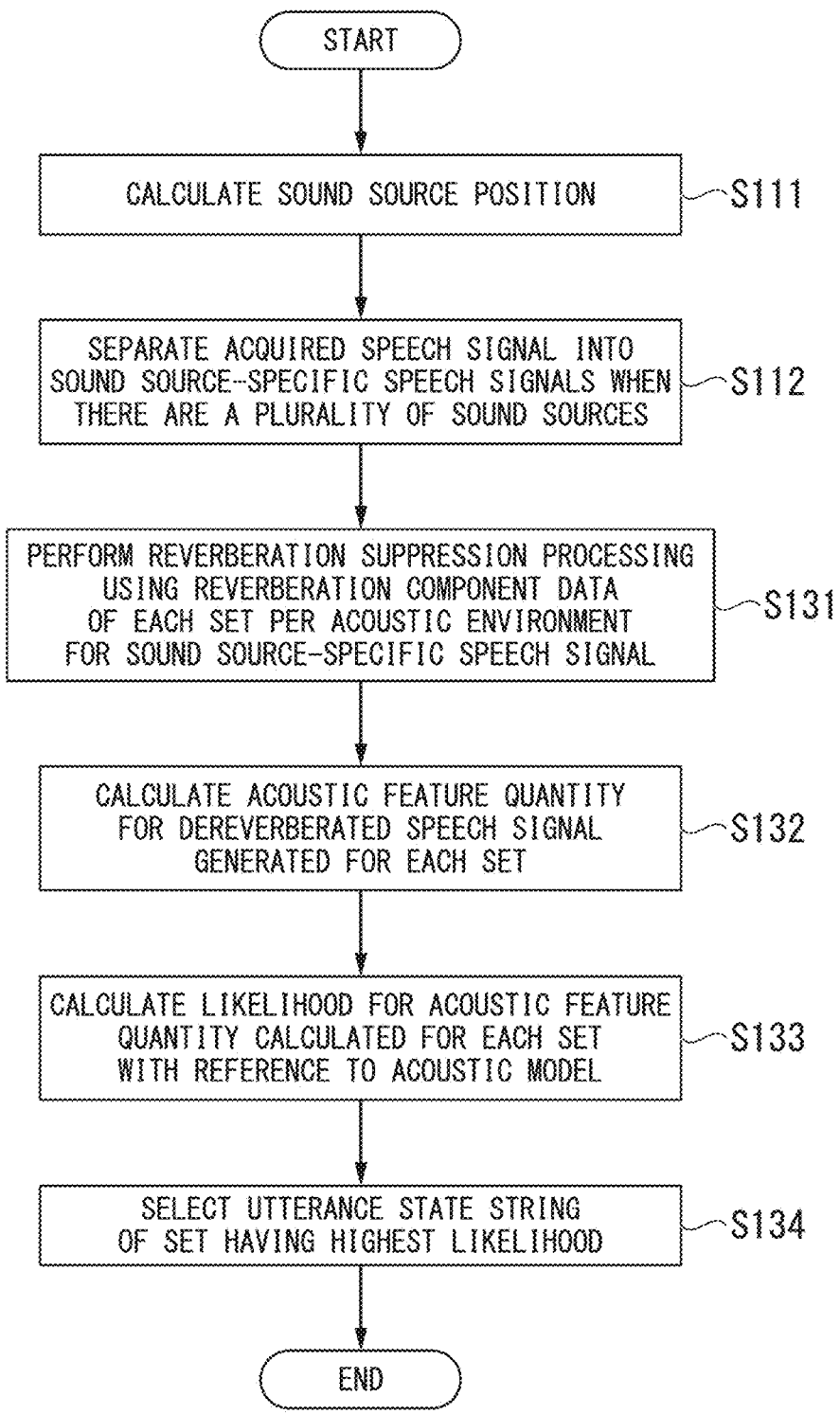
FIG. 19 is a flowchart showing speech processing according to the third embodiment.

Next, speech processing (online processing) according to this embodiment will be described. FIG. 19 is a flowchart showing the speech processing according to this embodiment.

The speech processing shown in FIG. 19 has Steps S111, S112, and S131 to S134. After the processing of Steps S111 and S112 ends, the process progresses to Step S131.

(Step S131) The reverberation suppression unit 103A performs reverberation suppression processing on the sound source-specific speech signal of each sound source using reverberation component data of each set z to generate a dereverberated speech signal. Thereafter, the process progresses to Step S132.

(Step S132) The feature quantity calculation unit 104A calculates the acoustic feature quantity for each frame with respect to the dereverberated speech signal generated for each set z. Thereafter, the process progresses to Step S133.

(Step S133) The speech recognition unit 111A calculates a likelihood for a utterance state string given from an acoustic feature quantity string having the acoustic feature quantities calculated for the sets z using the acoustic model. Thereafter, the process progresses to Step S134.

(Step S134) The speech recognition unit 111A selects an utterance state string relating to a set z' which gives the highest likelihood among the likelihood calculated for each set z. The speech recognition unit 111A calculates a likelihood of each candidate or a sentence represented by the phoneme strings on the basis of a language model among the phoneme strings corresponding to the selected utterance state string. The speech recognition unit 111A outputs recognition data representing a sentence with the highest likelihood to the outside of the speech processing device 10A. Thereafter, the processing shown in FIG. 19 ends.

(Operation Verification)

Next, an example of operation verification of the speech processing system 2A according to this embodiment will be described.

The operation verification is performed in each of the laboratories 1 to 4 described above. As the acoustic model, a three-state HMM based on the GMM obtained by learning using World Street Journal corpus in advance is used.

Uttered speech in English of ten speakers is used as test data. Each speaker performs utterance 20 times at each of the sound source positions P1 to P6. As the content of utterance, an utterance sentence in English constituting the conversation in the sushi restaurant described above is used as a given content prepared as an article in advance. Accordingly, as a result of spoken language understanding, the name of fish in Japanese is obtained from the operation determination unit 272. The sound source positions P1 to P5, and P6 correspond to the sound source positions T1 to T5, and T7 of FIG. 12. Accordingly, the distance from the sound pickup unit 12 provided in the robot Rt increases in order of the sound source positions P1 to P6. The sound source positions P1 to P5, and P6 are common among the laboratories 1 to 4.

As the experimental results, both of automatic speech recognition and spoken language understanding are evaluated at each of the sound source positions P1 to P6. As the accuracy of the automatic speech recognition, the word accuracy rate in recognition data obtained from the speech recognition unit 111A is determined. As the accuracy of the spoken language understanding, the accuracy rate of the name of fish in Japanese obtained from the operation determination unit 272 is determined.

In regard to the automatic speech recognition, other than the uttered speech of the speaker, a reverberant speech signal generated through a simulation is input, and a word accuracy rate in recognition data obtained from the speech recognition unit 111A is determined. In the simulation, a convolution operation of the RTF of each acoustic environment $\xi$ (each set of the laboratories 1 to 4 and the sound source positions) and clean speech signal is performed to generate a reverberant speech signal.

For comparison, the operation verification is performed for the speech processing in the related art using the same method, and the word accuracy rate and the accuracy rate of the name of fish are respectively determined. As the speech processing in the related art, the following methods (a) to (e) are used. The method (a) is a method in which speech recognition processing is performed on a recorded speech signal without performing reverberation suppression (No Enhancement). The method (b) is a method including reverberation suppression processing based on linear prediction (Based on LP Residuals).

The method (c) is a method including reverberation suppression processing based on clustering of extreme values of wavelet transformation (Based on Wavelet Extrema). The method (d) is a method including adaptive learning of an acoustic model to reverberation and background noise (Based on Feature Adaptation). The method (e) is a method including spectrum subtraction using a reverberation suppression model in the related art (Previous Reverberation Model). The method (e) is processing for suppressing a reverberation component using a reverberation component factor, which takes a larger value with an increasing distance between the sound pickup unit 12 and the speaker, instead of the reverberation component factor $\delta_b$ according to this embodiment. The method (f) is the speech processing according to this embodiment.

(Automatic Speech Recognition)

Next, the accuracy of the automatic speech recognition obtained through the operation verification will be described.

FIG. 20 is a diagram showing an example of sound source position dependence of a word accuracy rate. Each row of FIG. 20 shows a method for speech processing, and each column shows a sound source position. The word accuracy rate shown in FIG. 20 is based on the total sum of the number of uttered words and the number of accurate words among the words. The total sum of the number of words is taken among the laboratories 1 to 4. In all of the methods (a) to (f), the word accuracy rate is lowered in order of the sound source positions P1 to P6. For example, in the method (f), the word accuracy rates at the sound source positions P1 and P6 are 91.2% and 66.4%. This indicates that the speech recognition accuracy is lowered since the reverberation component is dominant with an increasing distance between the sound source position and the sound pickup unit 12.

However, the word accuracy rate becomes higher in order of the methods (a) to (f). For example, at the sound source position P6, the word accuracy rates of the methods (a) and (f) are 27.3% and 66.4%. This indicates that decrease of the speech recognition accuracy is suppressed since the reverberation component factor $\delta_b$ relating to the set with the highest likelihood is used in the reverberation component suppression processing of the method (f) according to this embodiment.

Figures 21, 22:
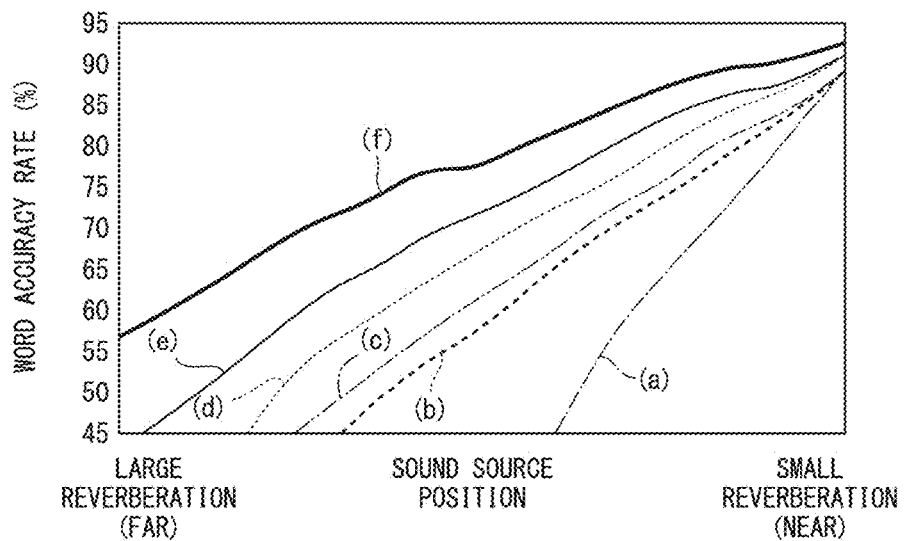
FIG. 21 is a diagram showing another example of sound source position dependence of a word accuracy rate.
FIG. 22 is a diagram showing sound source position dependence of an accuracy rate.

FIG. 21 is a diagram showing another example of sound source position dependence of a word accuracy rate.

In FIG. 21, the vertical axis and the horizontal axis respectively indicate a word accuracy rate and a sound source position. The word accuracy rate shown in FIG. 21 is based on the total sum of the number of known words included in the reverberant speech signal obtained through the simulation among the laboratories 1 to 4 and the number of accurate words among the words. In all of the method (a) to (f), the word accuracy rate tends to be lowered with an increasing distance between the sound pickup unit 12 and the sound source position; however, the word accuracy rate tends to be higher in order of the methods (a) to (f). This tendency meets the sound source position dependence of the word accuracy rate shown in FIG. 20, and supports the validity of the speech processing according to this embodiment.

(Spoken Language Understanding)

Next, the accuracy of the spoken language understanding obtained through the operation verification will be described.

FIG. 22 is a diagram showing sound source position dependence of an accuracy rate. Each row of FIG. 22 shows a method for speech processing, and each column shows a sound source position. The accuracy rate shown in FIG. 22 is based on the total sum of the number of utterances of the name of fish uttered and the number of accurate utterance. The total sum of the number of utterances is taken among the laboratories 1 to 4. In all of the methods (a) to (f), the accuracy rate is lowered in order of the sound source positions P1 to P6. For example, in the method (f), the accuracy rates at the sound source positions P1 and P6 are 100.0% and 59.0%. This indicates that decrease of the speech recognition accuracy due to the reverberation component obstructs utterance understanding. However, the accuracy rate becomes higher in order of the methods (a) to (f).

For example, at the sound source position P6, the accuracy rates of the methods (a) and (f) are 10.0% and 59.0%. This indicates that the obstruction of utterance understanding due to decrease of the speech recognition accuracy is relaxed since significant decrease of the speech recognition accuracy is suppressed by the method (f) according to this embodiment when the reverberation component is dominant.

Although a case where the sound source positions determined in advance are used as the elements of the acoustic environment in the reverberation component data generation processing (FIG. 18) described above has been illustrated, the invention is not limited thereto. Sound source positions (for example, an interval of 1 m) selected by clustering based on a likelihood from temporary sound source positions distributed (for example, an interval of 20 cm) with a higher density may be used. The likelihood is calculated by performing the speech recognition processing of Steps S132 to S134 on the acoustic feature quantity of the reverberant speech signal acquired for each of the temporary sound source positions. Clustering is processing for determining a group having temporary sound source positions such that the likelihood and the temporary sound source position are respectively within a predetermined range. A position (for example, the center of gravity of the temporary sound source position belonging to the group) representing each group is selected as the sound source position used as the element of the acoustic environment $\xi$. In clustering, a known clustering method, for example, a method, such as a shortest distance method or a center-of-gravity method, can be used. The reverberant speech signal is not limited to the speech signal acquired by the sound pickup unit 12, and may be a signal generated by performing a convolution operation of the RTF relating to each temporary sound source position and the clean speech signal. With this, in the speech processing described above, even if the calculation amount is reduced by decreasing the number of pieces of reverberation component data of each acoustic environment decrease of the speech recognition accuracy is suppressed.

Although a case where the filter processing using the correction factor in Steps S121 and S125 is a convolution operation (or multiplication equivalent to a convolution operation in a frequency domain) has been illustrated, the invention is not limited thereto. All kinds of filter processing, for example, infinite impulse response (IIR) filter processing, may be applied as long as the filter processing is the same or equivalent processing between Steps S121 and S125.

Although a case where the speech processing device 10A executes Steps S131 to S134 of the speech processing (FIG. 19) described above for the sets z relating to all acoustic environments has been illustrated, the invention is not limited thereto. speech processing device 10A may include an acoustic environment selection unit (not shown) which selects an acoustic environment relating to a sound source position of each sound source-specific speech signal, and may execute Steps S131 to S134 for each set z relating to the selected acoustic environment $\xi$. The acoustic environment selection unit selects, for example, an acoustic environment relating to the sound source position determined by the sound source localization unit 101 or a sound source position closest to this sound source position. The acoustic environment selection unit may perform image recognition processing on an image signal acquired from an imaging device to determine a sound source position and may select an acoustic environment relating to the determined sound source position or a sound source position closest to this sound source position. With this, since the candidates of the acoustic environment are narrowed, it is possible to reduce the amount of processing of Steps S131 to S134.

When the speech processing device 10A executes Steps S131 to S134 of the speech processing (FIG. 19) described above for the sets z relating to all acoustic environments $\xi$, the sound source localization unit 101 and the sound source separation unit 102 in the speech processing device 10A may be omitted. In this case, it should suffice that the sound pickup unit 12 can acquire a speech signal of one channel. The reverberation suppression unit 103A performs reverberation suppression processing on the speech signal from the sound pickup unit 12, instead of the sound source-specific speech signal described above.

As described above, the speech processing device 10A includes the reverberation suppression unit 103A which generates the dereverberated speech signal for each set z relating to each acoustic environment from the acquired reverberant speech signal on the basis of reverberation component data of each set z of each acoustic environment $\xi$, and the feature quantity calculation unit 104A which calculates the acoustic feature quantity of the dereverberated speech signal. The speech processing device 10A includes the speech recognition unit 111A which calculates the likelihood of the utterance state string from the acoustic feature quantity for each set z and sets the utterance state string on the basis of the calculated likelihood. Then, reverberation component data is data which indicates the reverberation component factor $\delta_b$ indicating the contribution of the reverberation component given by the corrected RTF obtained through the filter processing on the RTF indicating a predetermined reverberation characteristic. The correction factor $[\alpha]$ for use in the filter processing is set such that the likelihood which is calculated by using the acoustic model calculated on the basis of the acoustic feature quantity calculated from the corrected speech signal obtained through the filter processing on the reverberant speech signal is higher than the likelihood which is calculated on the basis of the acoustic feature quantity calculated from the reverberant speech signal of each acoustic environment $\xi$.

For this reason, the reverberation component speech signal with the reverberation component is obtained using reverberation component data of each set z different according to the acoustic environment $\xi$, such as the sound source position or the room reverberation characteristic. Then, with respect to the utterance state string corresponding to the acoustic feature quantity string having the acoustic feature quantity calculated from the reverberation component speech signal obtained for each set z, the phoneme strings corresponding to the utterance state string giving a higher likelihood are specified. For this reason, decrease of the speech recognition accuracy due to the influence of reverberation which may vary according to the acoustic environment $\xi$ is suppressed.

The acoustic model for use in calculating the likelihood is a model representing the appearance probability of the utterance state by the linear combination of the normal distribution of the feature quantity, and for calculating the correction factor $[\alpha]$, the correction factor $[\alpha]$ is updated such that the likelihood $\Gamma([\alpha])$ is made higher using the gradient of the likelihood $\Gamma([\alpha])$ with respect to the correction factor $[\alpha]$.

For this reason, the gradient of the likelihood $\Gamma([\alpha])$ with respect to the correction factor $[\alpha]$ is calculated by the product-sum operation between the bases constituting the acoustic model. For this reason, it is possible to reduce the calculation amount or calculation time required for calculating the correction factor $[\alpha]$.

Although the embodiments of the invention have been described referring to the drawings, a specific configuration is not limited thereto, and various design changes and the like can be made without departing from the scope of the invention.

For example, the speech processing devices 10 and 10A may be carried out as a single device, or may be carried out as part of the speech processing systems 1, 1A, 2, and 2A. In the speech processing systems 2 and 2A, either the speech reproduction unit 28 or the operation mechanism unit 29 may be omitted.

The processing data generation unit 14 may calculate the reverberation component factor $\delta_b$ and may set the calculated reverberation component factor $\delta_b$ in the reverberation suppression unit 103. The processing data generation unit 14 may be integrated with other configurations of the speech processing devices 10 and 10A and may be constituted as part of the single speech processing devices 10 and 10A, or may be constituted separately from the speech processing device 10, for example, a general-purpose computer.

Part of the speech processing devices 10 and 10A of the speech processing systems 1 and 1A in the embodiments and modification examples described above, for example, part of the sound source localization unit 101, the sound source separation unit 102, the reverberation suppression units 103 and 103A, the feature quantity calculation units 104 and 104A, the feature quantity adjustment unit 105, the model update unit 110, and the speech recognition units 111 and 111A, and part of the speech processing systems 2 and 2A, for example, the operation control unit 27 may be realized by a computer. In this case, a program for realizing the control function of the device may be recorded in a computer-readable recording medium, and the program recorded on the recording medium may be read into a computer system and executed to realize the control function. The "computer system" used herein is assumed to be a computer system embedded in the speech processing devices 10 and 10A and the speech processing system 1, 1A, 2, and 2A and including an OS and hardware, such as peripherals. Furthermore, the "computer-readable recording medium" used herein refers to a portable medium, such as a flexible disk, a magneto-optical disk, a ROM, or a CD-ROM, or a storage device, such as a hard disk embedded in the computer system. In addition, the "computer-readable recording medium" may also include a medium which dynamically holds a program for a short period of time, such as a communication line when the program is transmitted through a network, such as the Internet, or a communication network line, such as a telephone network line, and a medium which holds the program for a given period of time, such as a volatile memory in a computer system which serves as a server or a client. The program described above may be a program which realizes part of the functions described above. The functions described above may be realized in combination with a program having already been recorded in the computer system.

Part or all of the first speech processing devices 10 and 10A in the embodiments and modification examples described above may be realized as an integrated circuit, such as large scale integration (LSI). Each of the functional blocks of each of the speech processing device 10 may be individually realized in the form of a processor, or part or all of the functional blocks may be integrated in the form of a processor. A circuit integration technique is not limited to LSI and may be realized in the form of a dedicated circuit or a general-purpose processor. When the advance of a semiconductor technology allows advent of a circuit integration technique which replaces LSI, an integrated circuit based on the technology may be used.

What is claimed is:

1. A speech processing device comprising:
   a sound source localization unit configured to determine a sound source position from acquired speech;
   a reverberation suppression unit configured to suppress a reverberation component of the speech to generate dereverberated speech;
   a feature quantity calculation unit configured to calculate a feature quantity of the dereverberated speech;
   a feature quantity adjustment unit configured to multiply the feature quantity by an adjustment factor corresponding to the sound source position to calculate an adjusted feature quantity;
   a speech recognition unit configured to perform speech recognition using the adjusted feature quantity; and
   a model update unit configured to select a predetermined number of position-dependent acoustic models on the basis of the likelihood calculated by using the adjusted feature quantity and a position-dependent acoustic model of each sound source position and linearly combines model parameters of the selected position-dependent acoustic model to generate a position-dependent acoustic model corresponding to the sound source position, wherein the speech recognition unit performs speech recognition using the acoustic model generated by the model update unit.

2. The speech processing device according to claim 1, wherein the adjustment factor is calculated in advance such that a likelihood for each phoneme which is calculated by using the adjusted feature quantity calculated by multiplying the feature quantity by the adjustment factor becomes higher than a likelihood for each phoneme calculated by using the feature quantity.

3. The speech processing device according to claim 1, wherein the model update unit further linearly combines model parameters of an acoustic model generated using clean speech to generate the position-dependent acoustic model corresponding to the sound source position determined by the sound source localization unit.

4. The speech processing device according to claim 1, wherein the model update unit eliminates a position-dependent acoustic model with the likelihood lower than a predetermined likelihood.

5. A speech processing device comprising:
a reverberation suppression unit configured to generate dereverberated speech for each acoustic environment from acquired speech on the basis of reverberation component data of each acoustic environment;
a feature quantity calculation unit configured to calculate a feature quantity of the dereverberated speech; and
a speech recognition unit configured to calculate a likelihood of an utterance state string from the feature quantity for each acoustic environment and selects an utterance state string on the basis of the likelihood,
wherein the reverberation component data is data indicating a contribution of a reverberation component given by correction reverberation characteristics obtained through predetermined filter processing for a predetermined reverberation characteristic, and a correction factor for use in the filter processing is set such that a likelihood which is calculated from a feature quantity of corrected speech obtained through the filter processing for the speech of each acoustic environment is higher than a likelihood calculated from a feature quantity of the speech of each acoustic environment.

6. The speech processing device according to claim 5, wherein an acoustic model for use in calculating the likelihood is a model representing an appearance probability of an utterance state by a linear combination of a normal distribution of a feature quantity, and for calculating the correction factor, the correction factor is updated such that the likelihood is made higher using a gradient of the likelihood with respect to the correction factor.

7. A speech processing system comprising:
a speech processing device; and
a sound pickup unit,
wherein the sound pickup unit picks up multi-channel speech,
the speech processing device includes
a sound source localization unit configured to determine a sound source position from the multi-channel speech,
a reverberation suppression unit configured to suppress a reverberation component of the speech to generate dereverberated speech,
a feature quantity calculation unit configured to calculate a feature quantity of the dereverberated speech,
a feature quantity adjustment unit configured to multiply the feature quantity by an adjustment factor corresponding to the sound source position to calculate an adjusted feature quantity, and
a speech recognition unit configured to perform speech recognition using the adjusted feature quantity,
wherein the adjustment factor is calculated in advance such that a likelihood for each phoneme which is calculated by using the adjusted feature quantity calculated by multiplying the feature quantity by the adjustment factor becomes higher than a likelihood for each phoneme calculated by using the feature quantity.

8. The speech processing system according to claim 7, an operation control unit configured to execute an operation according to utterance recognized by the speech recognition unit.

9. A speech processing method for a speech processing device comprising:
a sound source localization step of determining a sound source position from acquired speech;
a reverberation suppression step of suppressing a reverberation component of the speech to generate dereverberated speech;
a feature quantity calculation step of calculating a feature quantity of the dereverberated speech;
a feature quantity adjustment step of multiplying the feature quantity by an adjustment factor corresponding to the sound source position to calculate an adjusted feature quantity; and
a speech recognition step of performing speech recognition using the adjusted feature quantity,
wherein the adjustment factor is calculated in advance such that a likelihood for each phoneme which is calculated by using the adjusted feature quantity calculated by multiplying the feature quantity by the adjustment factor becomes higher than a likelihood for each phoneme calculated by using the feature quantity.

10. A speech processing device comprising:
a sound source localization unit configured to determine a sound source position from acquired speech;
a reverberation suppression unit configured to suppress a reverberation component of the speech to generate dereverberated speech;
a feature quantity calculation unit configured to calculate a feature quantity of the dereverberated speech;
a feature quantity adjustment unit configured to multiply the feature quantity by an adjustment factor corresponding to the sound source position to calculate an adjusted feature quantity; and
a speech recognition unit configured to perform speech recognition using the adjusted feature quantity,
wherein the adjustment factor is calculated in advance such that a likelihood for each phoneme which is calculated by using the adjusted feature quantity calculated by multiplying the feature quantity by the adjustment factor becomes higher than a likelihood for each phoneme calculated by using the feature quantity.

* * * * *